US011526270B2

(12) United States Patent
Karunamuni et al.

(10) Patent No.: US 11,526,270 B2
(45) Date of Patent: Dec. 13, 2022

(54) USER INTERFACE FOR LIMITING NOTIFICATIONS AND ALERTS

(71) Applicant: Apple Inc., Cupertino, CA (US)

(72) Inventors: Chanaka G. Karunamuni, San Jose, CA (US); Gary Ian Butcher, San Jose, CA (US); Imran Chaudhri, San Francisco, CA (US); Duncan Robert Kerr, San Francisco, CA (US); Kevin Lynch, Woodside, CA (US); Curtis A. Rothert, Morgan Hill, CA (US); Monica Jenkins, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 14/830,693

(22) Filed: Aug. 19, 2015

(65) Prior Publication Data

US 2016/0062590 A1    Mar. 3, 2016

Related U.S. Application Data

(60) Provisional application No. 62/129,838, filed on Mar. 7, 2015, provisional application No. 62/042,217, filed on Aug. 26, 2014.

(51) Int. Cl.
*G06F 3/0488* (2022.01)
*G06F 3/01* (2006.01)
(Continued)

(52) U.S. Cl.
CPC ............ *G06F 3/0488* (2013.01); *G06F 3/017* (2013.01); *G06F 3/0346* (2013.01);
(Continued)

(58) Field of Classification Search
CPC . G06F 2203/04105; G06F 2203/04108; G06F 3/017; G06F 3/0346; G06F 3/0414;
(Continued)

(56) References Cited

U.S. PATENT DOCUMENTS 7,443,971 B2    10/2008  Bear et al.
7,671,756 B2 *   3/2010  Herz ....................... G06F 3/017
                                                    340/576
(Continued)

FOREIGN PATENT DOCUMENTS

AU    2014206208 A1    8/2014
CN     102428437 A     4/2012
(Continued)

OTHER PUBLICATIONS

Loie Favre, Get blocking mode functions on your Android thanks to Do Not Disturb, Feb. 3, 2014, http:/www.androidpit.com/do-not-disturb-blocking-mode, pp. 1-10.*
(Continued)

*Primary Examiner* — Michael J Jansen, II
(74) *Attorney, Agent, or Firm* — Dentons US LLP

(57) ABSTRACT

The present disclosure relates to systems and processes for limiting notifications on an electronic device. In one example process, data representing a user input can be received by an electronic device. The data representing the user input can include touch data from the touch-sensitive device, ambient light data from an ambient light sensor, intensity data from a contact intensity sensor, and/or motion data from one or more motion sensors. Based on the data, it can be determined whether the user input is a cover gesture over a touch-sensitive display of the electronic device. In response to determining that the user input is a cover gesture over the touch-sensitive display, the electronic device can be put into a DND mode for a predetermined amount of time.
(Continued)

While in the DND mode, the electronic device can cease to output some or all notifications.

52 Claims, 22 Drawing Sheets

(51) Int. Cl.
    *G06F 3/0346*     (2013.01)
    *G06F 3/04883*     (2022.01)

(52) U.S. Cl.
    CPC ............... *G06F 3/04883* (2013.01); *G06F 2203/04105* (2013.01); *G06F 2203/04108* (2013.01)

(58) Field of Classification Search
    CPC G06F 3/0488; G06F 3/04883; H04M 19/045; H04M 1/72569
    See application file for complete search history.

(56) References Cited

U.S. PATENT DOCUMENTS

| | | | | |
|---|---|---|---|---|
| 7,813,774 | B2* | 10/2010 | Perez-Noguera | G06F 3/0202 345/169 |
| 7,957,762 | B2* | 6/2011 | Herz | G06F 1/3231 455/66.1 |
| 8,340,263 | B2 | 12/2012 | Rondeau et al. | |
| 8,344,325 | B2* | 1/2013 | Merrell | G06F 3/0325 250/349 |
| 8,441,453 | B2 | 5/2013 | Westerman et al. | |
| 8,559,932 | B2* | 10/2013 | Elliott | H04M 1/6091 455/418 |
| 8,605,872 | B2 | 12/2013 | Mock | |
| 8,605,873 | B2* | 12/2013 | Mock | H04L 12/1827 348/14.03 |
| 8,698,727 | B2 | 4/2014 | Herz et al. | |
| 9,204,094 | B2* | 12/2015 | Mock | H04N 7/15 |
| 9,268,404 | B2* | 2/2016 | Clavin | G06F 3/017 |
| 9,348,607 | B2* | 5/2016 | Chaudhri | G06F 9/4421 |
| 9,477,396 | B2* | 10/2016 | Park | G06F 3/0488 |
| 9,521,245 | B2* | 12/2016 | Yang | G04G 21/04 |
| 9,690,475 | B2* | 6/2017 | Miyazaki | G06F 3/04883 |
| 10,146,329 | B2* | 12/2018 | Pang | G06F 3/0346 |
| 2004/0223599 | A1* | 11/2004 | Bear | H04M 3/436 379/207.02 |
| 2008/0042978 | A1* | 2/2008 | Perez-Noguera | G06F 3/0202 345/168 |
| 2008/0165022 | A1 | 7/2008 | Herz et al. | |
| 2008/0167834 | A1 | 7/2008 | Herz et al. | |
| 2010/0299642 | A1 | 11/2010 | Merrell et al. | |
| 2011/0173574 | A1 | 7/2011 | Clavin et al. | |
| 2012/0019562 | A1* | 1/2012 | Park | G06F 3/0488 345/657 |
| 2012/0092283 | A1* | 4/2012 | Miyazaki | G06F 3/042 345/173 |
| 2012/0157069 | A1 | 6/2012 | Elliott | |
| 2012/0218177 | A1 | 8/2012 | Pang et al. | |
| 2013/0002799 | A1* | 1/2013 | Mock | G06F 3/04883 348/14.03 |
| 2013/0002800 | A1* | 1/2013 | Mock | G06F 3/04883 348/14.03 |
| 2013/0002801 | A1* | 1/2013 | Mock | H04N 7/15 348/14.03 |
| 2013/0002802 | A1* | 1/2013 | Mock | H04L 12/1827 348/14.03 |
| 2013/0332721 | A1* | 12/2013 | Chaudhri | G06F 9/4421 713/100 |
| 2014/0035853 | A1* | 2/2014 | Ok | G06F 3/0416 345/173 |
| 2015/0111558 | A1* | 4/2015 | Yang | G06F 3/017 455/418 |
| 2015/0346894 | A1* | 12/2015 | Landau | G06F 3/0488 345/173 |

FOREIGN PATENT DOCUMENTS

| | | |
|---|---|---|
| CN | 103581398 A | 2/2014 |
| TW | 201101126 A | 1/2011 |
| TW | 201329820 A1 | 7/2013 |
| TW | 201403510 A | 1/2014 |
| WO | 2013/021385 A2 | 2/2013 |
| WO | 2013/169849 A2 | 11/2013 |
| WO | 2013/184530 A1 | 12/2013 |

OTHER PUBLICATIONS

Paven, Setup Do Not Disturb Blocking Mode on Android With Calendars Sync & Silent Timer, Feb. 4, 2014, http://androidadvices.com/setup-donot-disturb-blocking-mode/, pp. 1-5.*
Ben D, All About Android Reviews Do Not Disturb App Transcript with Images, Jun. 29, 2014, http://youtu.be/GpsA4eich6c, pp. 1-19.*
Cambridge English Dictionary, https://dictionary.cambridge.org/us/dictionary/english/disable, pp. 1-3, Cambridge University Press 2021, Printed 07-08 (Year: 2021).*
Invitation to Pay Additional Fees and Partial International Search Report received for PCT Application No. PCT/US2015/045758, dated Oct. 20, 2015, 5 pages.
Office Action received for Australian Patent Application No. 2015101171, dated Oct. 28, 2015, 4 pages.
Office Action received for Chinese Patent Application No. 201520652155.3, dated Nov. 17, 2015, 4 pages (2 pages of English Translation and 2 pages of Official Copy).
Morris, Paul , "How To Add 'Do Not Disturb' Toggle On The iPhone Lock Screen", Available Online at <http://www.redmondpie.com/howtoadddonotdisturbtoggleontheiphonelockscreen/>, Redmond Pie, Mar. 6, 2013, 6 pages.
Danish Search Report received for Denmark Patent Application No. 201570549, dated Mar. 29, 2016, 9 pages.
International Search Report and Written Opinion received for PCT Patent Application No. PCT/US2015/045758, dated Jan. 19, 2016, 22 pages.
Office Action received for Danish Patent Application No. PA201570549, dated Oct. 21, 2016, 7 pages.
Office Action received for Taiwanese Patent Application No. 104127994, dated Dec. 27, 2016, 41 pages (15 pages of English Translation and 26 pages of Official Copy).
International Preliminary Report on Patentability received for PCT Patent Application No. PCT/US2015/045758, dated Mar. 9, 2017, 15 pages.
Office Action received for Taiwanese Patent Application No. 104127994, dated Apr. 4, 2017, 23 pages (Official Copy only) (See Communication under 37 CFR§ 1.98(a)(3)).
Office Action received for Danish Patent Application No. PA201570549, dated Sep. 6, 2017, 7 pages.
Office Action received for Taiwanese Patent Application No. 104127994, dated Oct. 31, 2017, 8 pages (3 pages of English Translation and 5 pages of Official Copy).
Illneedasaviour Teresa, "How to Mute Sounds Using Your Hand on the Samsung Galaxy S4", Online Available at: https://web.archive.org/web/20131127171228/http://www.wikihow.com/Mute-Sounds-Using-Your-Hand-on-the-Samsung-Galaxy-S4, Nov. 27, 2013, 8 pages.
Office Action received for Chinese Patent Application No. 201510532392.0, dated Dec. 21, 2017, 12 pages (5 pages of English translation and 7 pages of Official Copy).
Office Action received for Chinese Patent Application No. 201510532392.0, dated Nov. 5, 2018, 9 pages (3 pages English Translation Copy and 5 pages Official Copy).
Office Action received for Netherland Patent Application No. 2015339, dated Jan. 15, 2018, 13 pages (1 page of English Translation of Search Report and 12 pages of Official Copy).
Office Action received for Taiwanese Patent Application No. 104127994, dated Jan. 7, 2020, 79 pages (31 pages of English Translation and 48 pages of Official Copy).
Office Action received for Taiwanese Patent Application No. 104127994, dated Jan. 18, 2019, 32 pages (14 pages of English Translation and 18 pages of Official Copy).

(56) References Cited

OTHER PUBLICATIONS

Re-Examination Decision received for Taiwanese Patent Application No. 104127994, dated Jul. 30, 2019, 33 pages (13 pages of English Translation and 19 pages of Official Copy).
Rejection Decision received for Chinese Patent Application No. 201510532392.0, dated Jul. 8, 2019, 6 pages (1 page of English Translation and 5 pages of Official Copy).
Board Opinion received for Chinese Patent Application No. 201510532392.0, dated Jan. 29, 2021, 10 pages (2 pages of English Translation and 8 pages of Official Copy).
Board Decision received for Chinese Patent Application No. 201510532392.0, dated Jul. 28, 2021, 28 pages (2 pages of English Translation and 26 pages of Official Copy).

* cited by examiner

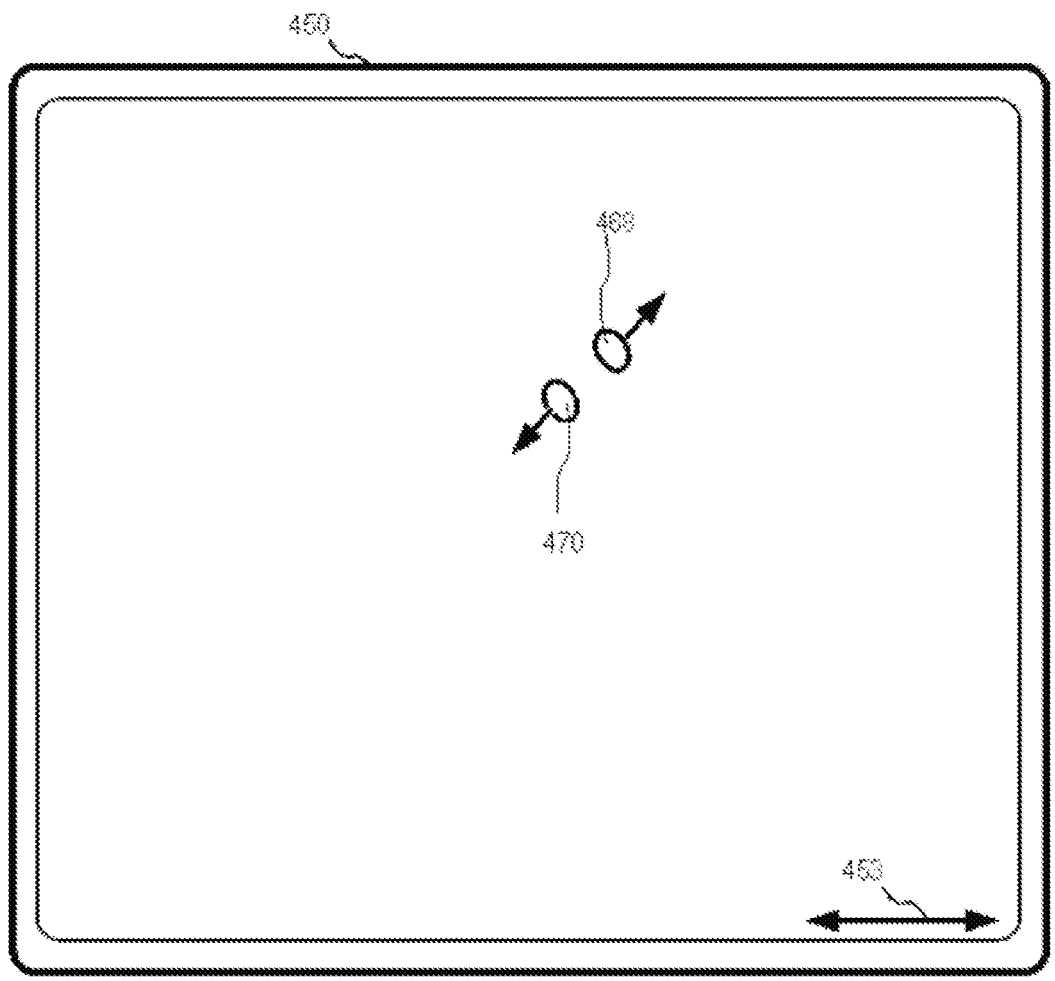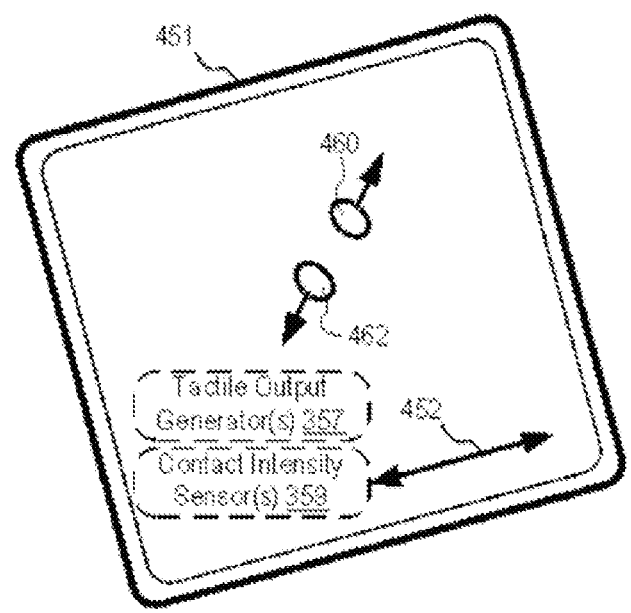
FIG. 4B

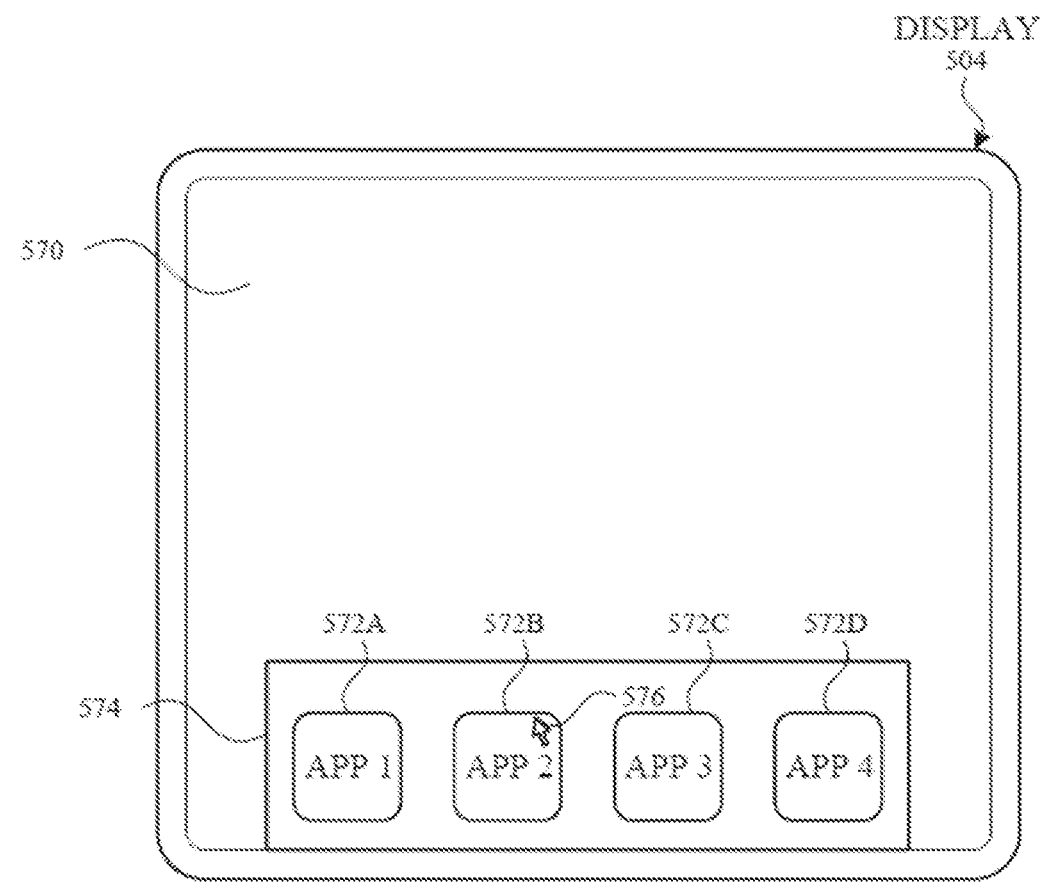
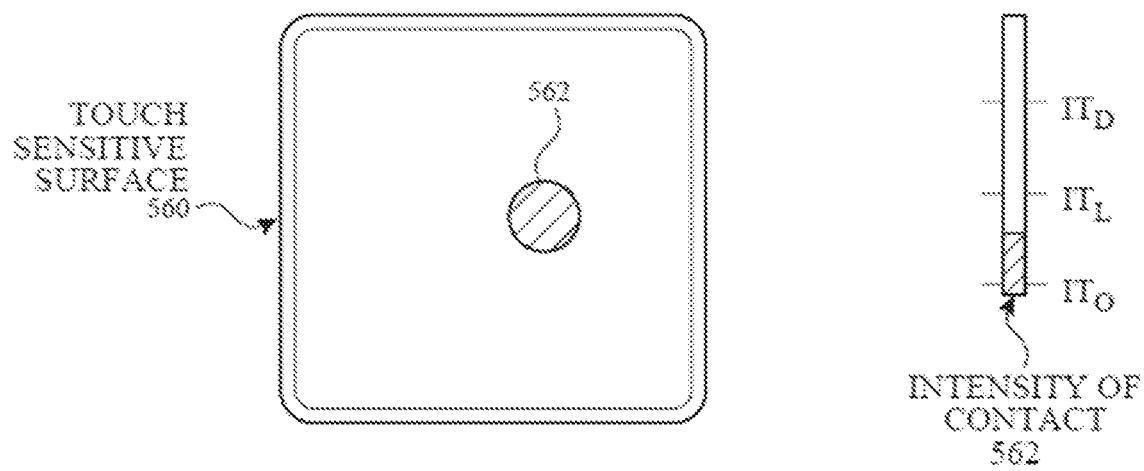
FIG. 5E

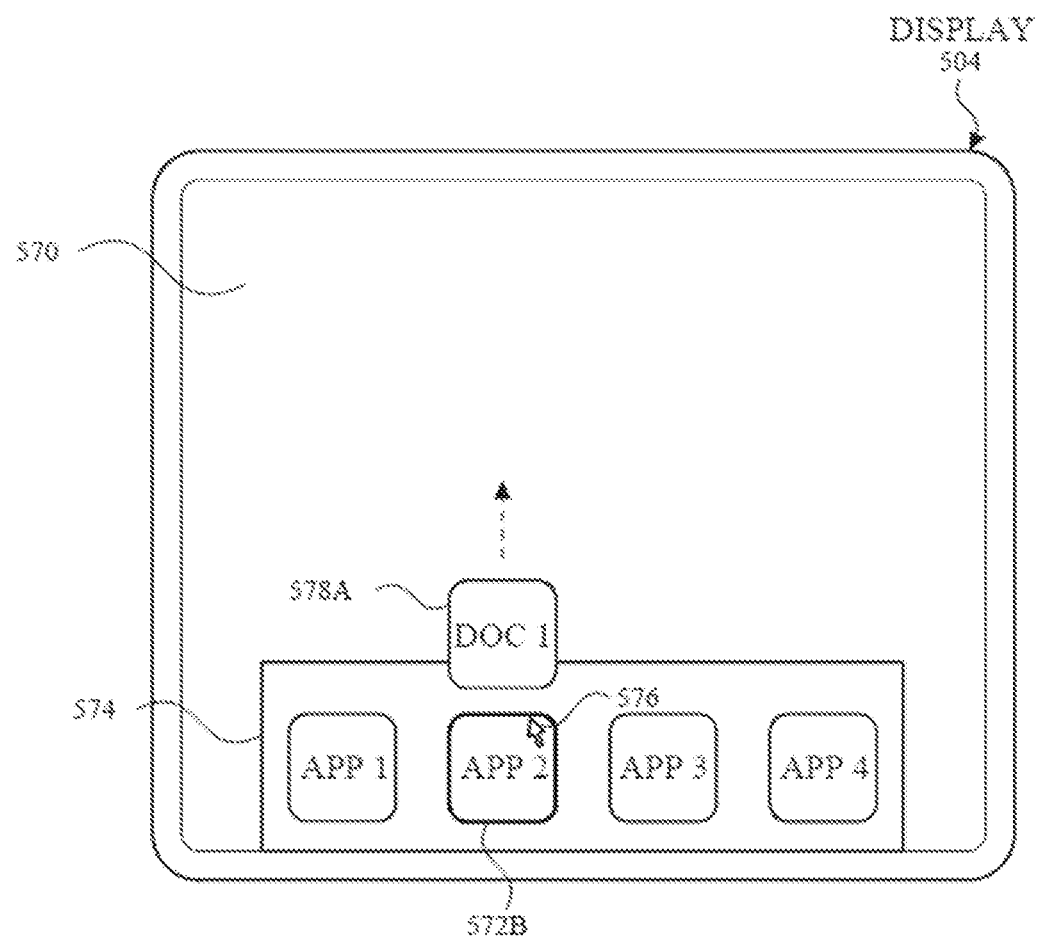
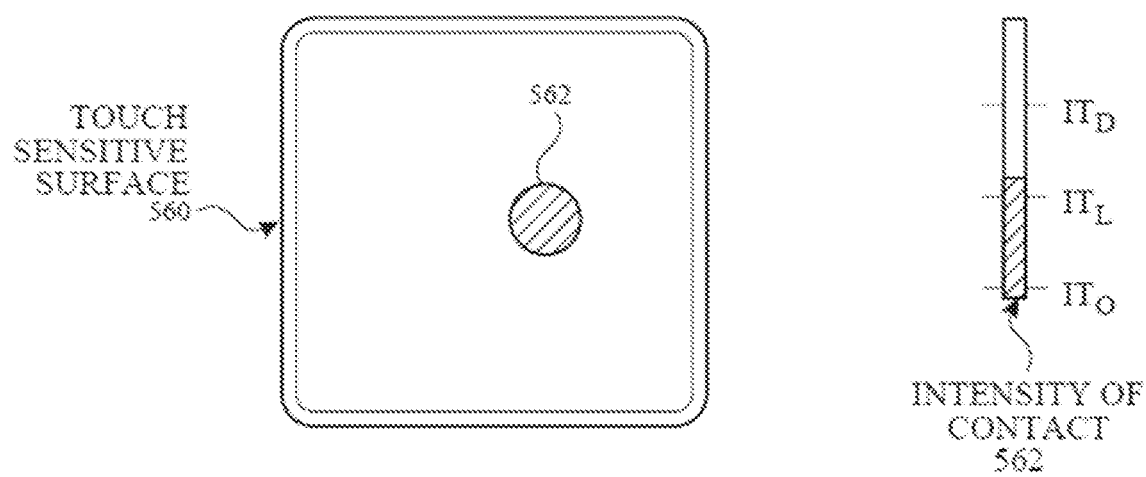
FIG. 5F

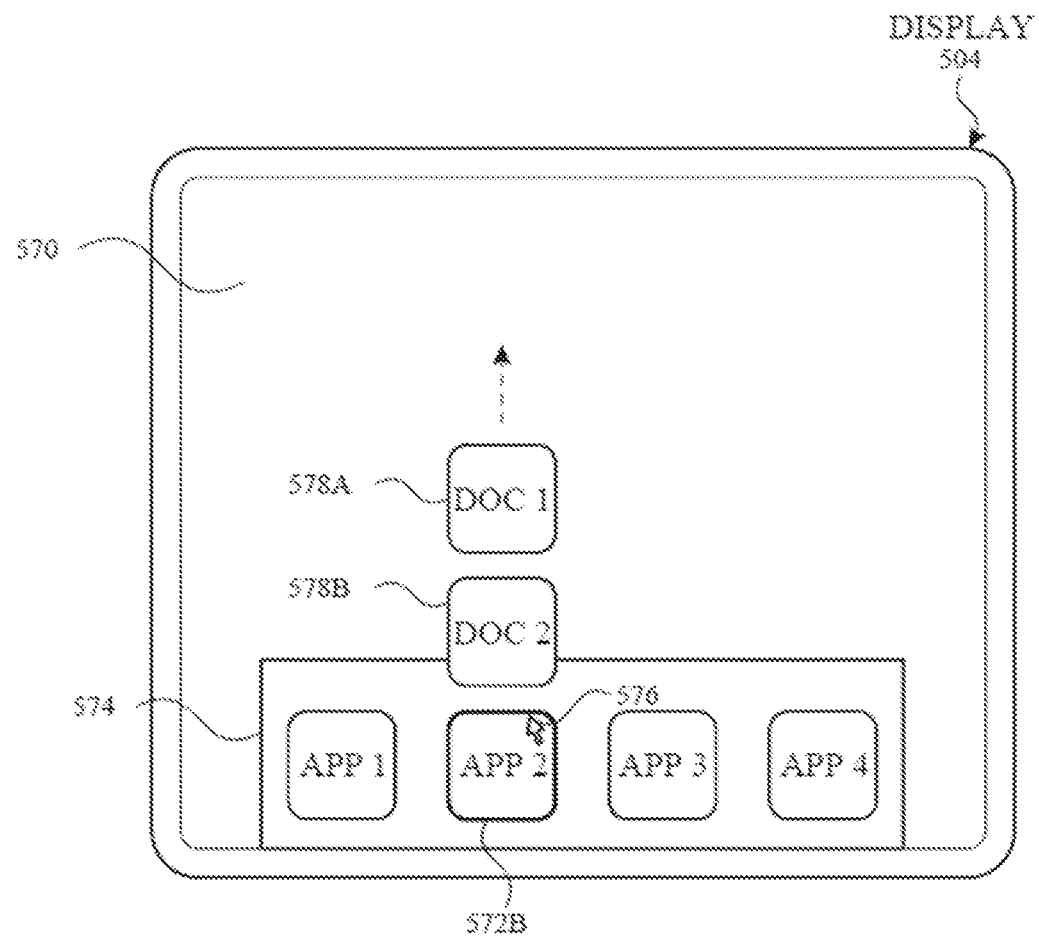
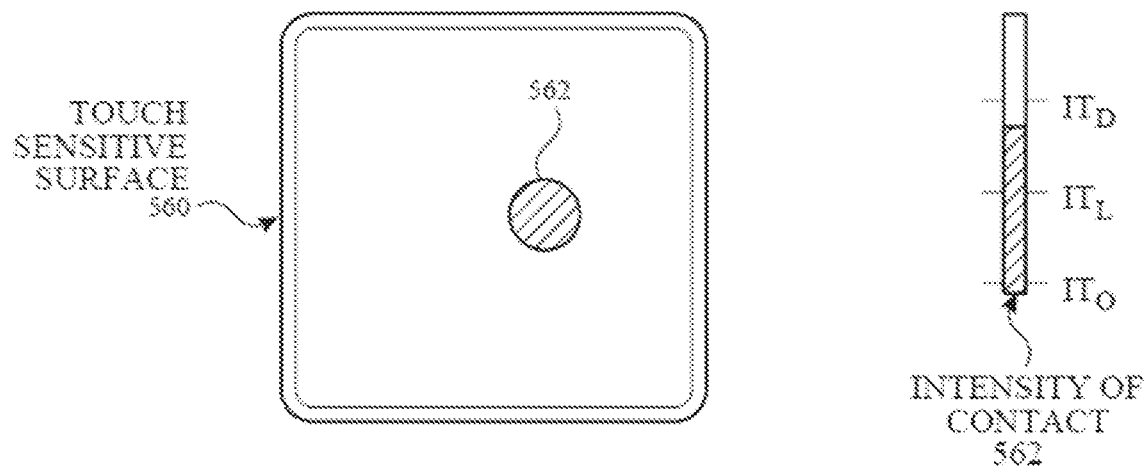
FIG. 5G

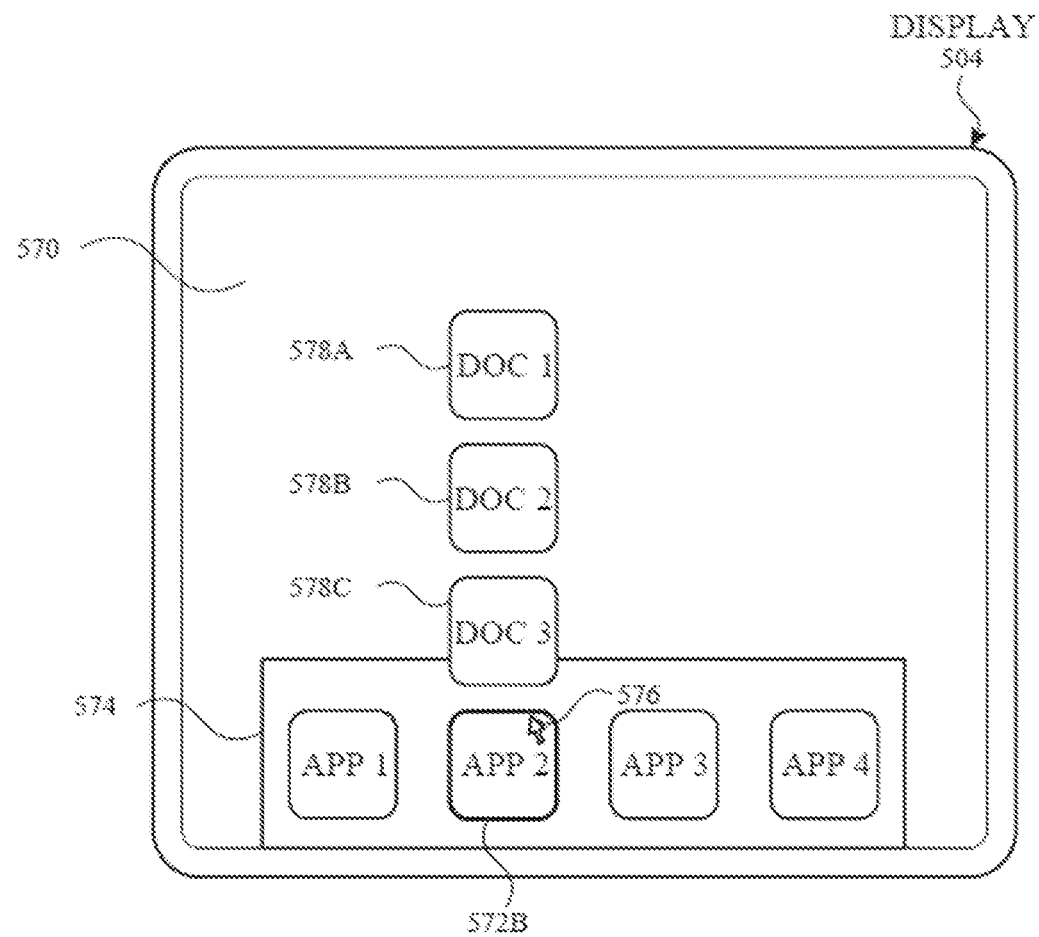
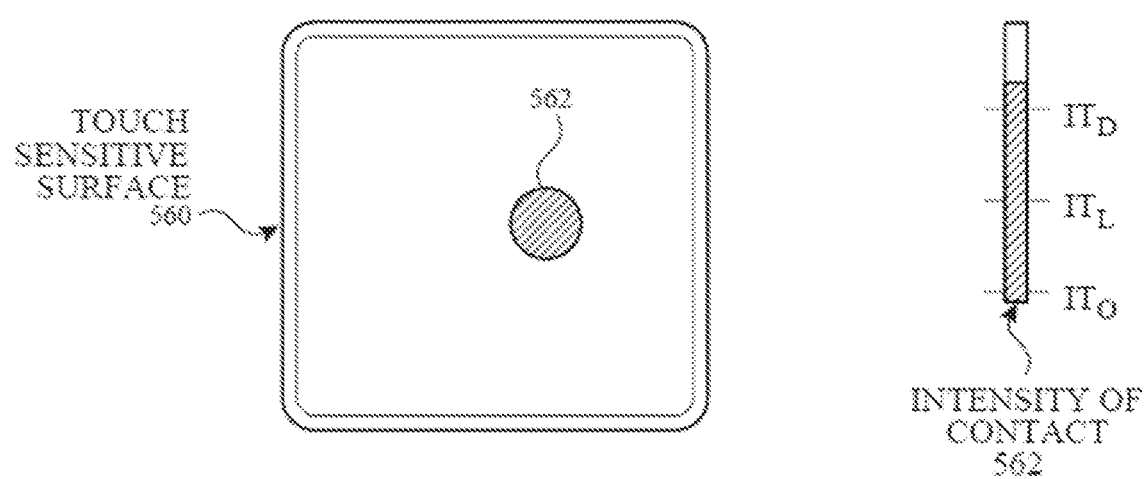
FIG. 5H

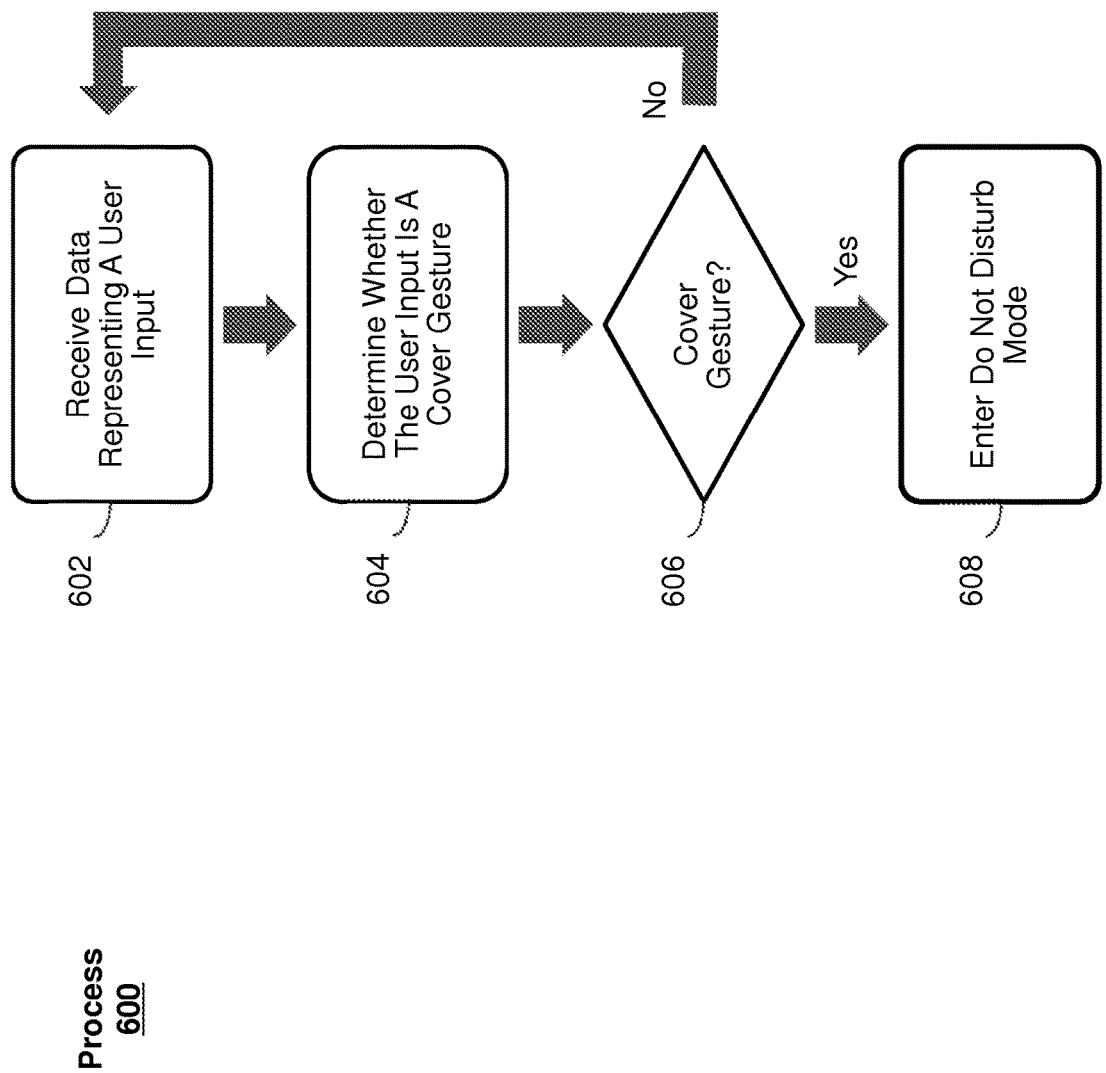

USER INTERFACE FOR LIMITING NOTIFICATIONS AND ALERTS

CROSS-REFERENCE TO RELATED APPLICATIONS

This application claims priority to U.S. Provisional Patent Application No. 62/042,217, entitled "USER INTERFACE FOR LIMITING NOTIFICATIONS AND ALERTS," filed Aug. 26, 2014, and U.S. Provisional Patent Application No. 62/129,838, entitled "USER INTERFACE FOR LIMITING NOTIFICATIONS AND ALERTS," filed Mar. 7, 2015, the content of each of which is hereby incorporated by reference in their entirety for all purposes.

This application relates to the following applications: International Patent Application Serial No. PCT/US2013/040061, entitled "Device, Method, and Graphical User Interface for Displaying User Interface Objects Corresponding to an Application," filed May 8, 2013 and published on Nov. 14, 2013 as Publication No. WO/2013/169849, and International Patent Application Serial No. PCT/US2013/069483, entitled "Device, Method, and Graphical User Interface for Transitioning Between Touch Input to Display Output Relationships," filed Nov. 11, 2013 and published on Jul. 3, 2014 as Publication No. WO/2014/105276. The contents of these applications are hereby incorporated by reference in their entirety.

BACKGROUND

1. Field

The present disclosure relates generally to notifications and, more specifically, to techniques for limiting notifications output by an electronic device.

2. Description of Related Art

Notifications are often used to alert a user to the occurrence of an event that may be of interest, or to remind the user of an upcoming event. These notifications can include a display of text or an image, an audible noise, a haptic output, or combinations thereof. For example, in response to receiving a text message, a mobile phone can vibrate and/or output an audible notification, such as a chime or ring, to alert the user to the receipt of the message. Additionally, the mobile phone can display the identity of the sender of the text message and a portion of the message on the display of the device. Similar notifications can be generated in response to the occurrence of any event, such as those associated with applications running on the electronic device, events scheduled in the user's calendar, or the like.

While these notifications can be useful to alert the user to an item of interest, there can be times during which the user may not want to receive the notification. For example, a user may not want their electronic device to vibrate or to output an audible noise while the user is in a business meeting or watching a movie.

To address this problem, current electronic devices can be silenced or placed into "do not disturb" (DND) modes by toggling a virtual or physical switch. While these features can effectively be used to prevent the electronic device from generating notifications, they can be cumbersome to use and require the user to remember to deactivate them when no longer needed.

Accordingly, there is a need for a more user-friendly technique for limiting notifications.

BRIEF SUMMARY

The present disclosure relates to systems and processes for limiting notifications on an electronic device. In one example process, data representing a user input can be received by an electronic device. The data representing the user input can include touch data from the touch-sensitive device, ambient light data from an ambient light sensor, intensity data from a contact intensity sensor, and/or motion data from one or more motion sensors. Based on the data, it can be determined whether the user input is a cover gesture over a touch-sensitive display of the electronic device. In response to determining that the user input is a cover gesture over the touch-sensitive display, the electronic device can be put into a DND mode for a predetermined amount of time. While in the DND mode, the electronic device can cease to output some or all notifications.

In some embodiments, a computer-implemented method comprises: at an electronic device comprising a touch-sensitive display: receiving data representing a user input; determining, based on the data representing the user input, whether the user input is a cover gesture over the touch-sensitive display; and in accordance with a determination that the user input is the cover gesture over the touch-sensitive display, causing the device to enter a do not disturb (DND) mode.

In some embodiments, an electronic device, comprises: a touch-sensitive display; one or more processors; a memory; and one or more programs, wherein the one or more programs are stored in the memory and configured to be executed by the one or more processors, the one or more programs including instructions for: receiving data representing a user input; determining, based on the data representing the user input, whether the user input is a cover gesture over the touch-sensitive display; and in accordance with a determination that the user input is the cover gesture over the touch-sensitive display, causing the device to enter a do not disturb (DND) mode.

In some embodiments, a non-transitory computer readable storage medium storing one or more programs, the one or more programs comprising instructions, which when executed by one or more processors of an electronic device with a touch-sensitive display, cause the electronic device to: receive data representing a user input; determine, based on the data representing the user input, whether the user input is a cover gesture over the touch-sensitive display; and in accordance with a determination that the user input is the cover gesture over the touch-sensitive display, cause the device to enter a do not disturb (DND) mode.

In some embodiments, a transitory computer readable storage medium storing one or more programs, the one or more programs comprising instructions, which when executed by one or more processors of an electronic device with a touch-sensitive display, cause the electronic device to: receive data representing a user input; determine, based on the data representing the user input, whether the user input is a cover gesture over the touch-sensitive display; and in accordance with a determination that the user input is the cover gesture over the touch-sensitive display, cause the device to enter a do not disturb (DND) mode.

In some embodiments, an electronic device, comprises: a touch-sensitive display; means for receiving data representing a user input; means for determining, based on the data representing the user input, whether the user input is a cover gesture over the touch-sensitive display; and means for causing, in accordance with a determination that the user input is the cover gesture over the touch-sensitive display, the system device to enter a do not disturb (DND) mode.

In some embodiments, an electronic device comprises: a touch-sensitive display unit; a processing unit coupled to the touch-sensitive display unit, the processing unit configured to: receive data representing a user input; determine, based on the data representing the user input, whether the user input is a cover gesture over the touch-sensitive display unit; and in accordance with a determination that the user input is the cover gesture over the touch-sensitive display unit, cause the device to enter a do not disturb (DND) mode.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5E-5H illustrate exemplary components and user interfaces of a personal electronic device in accordance with some embodiments.

FIG. 6 is a flow diagram illustrating a process for limiting notifications on an electronic device in accordance with some examples.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

The present disclosure relates to systems and processes for limiting notifications on an electronic device. In one example process, data representing a user input can be received by an electronic device. The data representing the user input can include touch data from the touch-sensitive device, ambient light data from an ambient light sensor, intensity data from a contact intensity sensor, and/or motion data from one or more motion sensors. Based on the data, it can be determined whether the user input is a cover gesture over a touch-sensitive display of the electronic device. In response to determining that the user input is a cover gesture over the touch-sensitive display, the electronic device can be put into a DND mode for a predetermined amount of time. While in the DND mode, the electronic device can cease to output some or all notifications.

Figure 2:
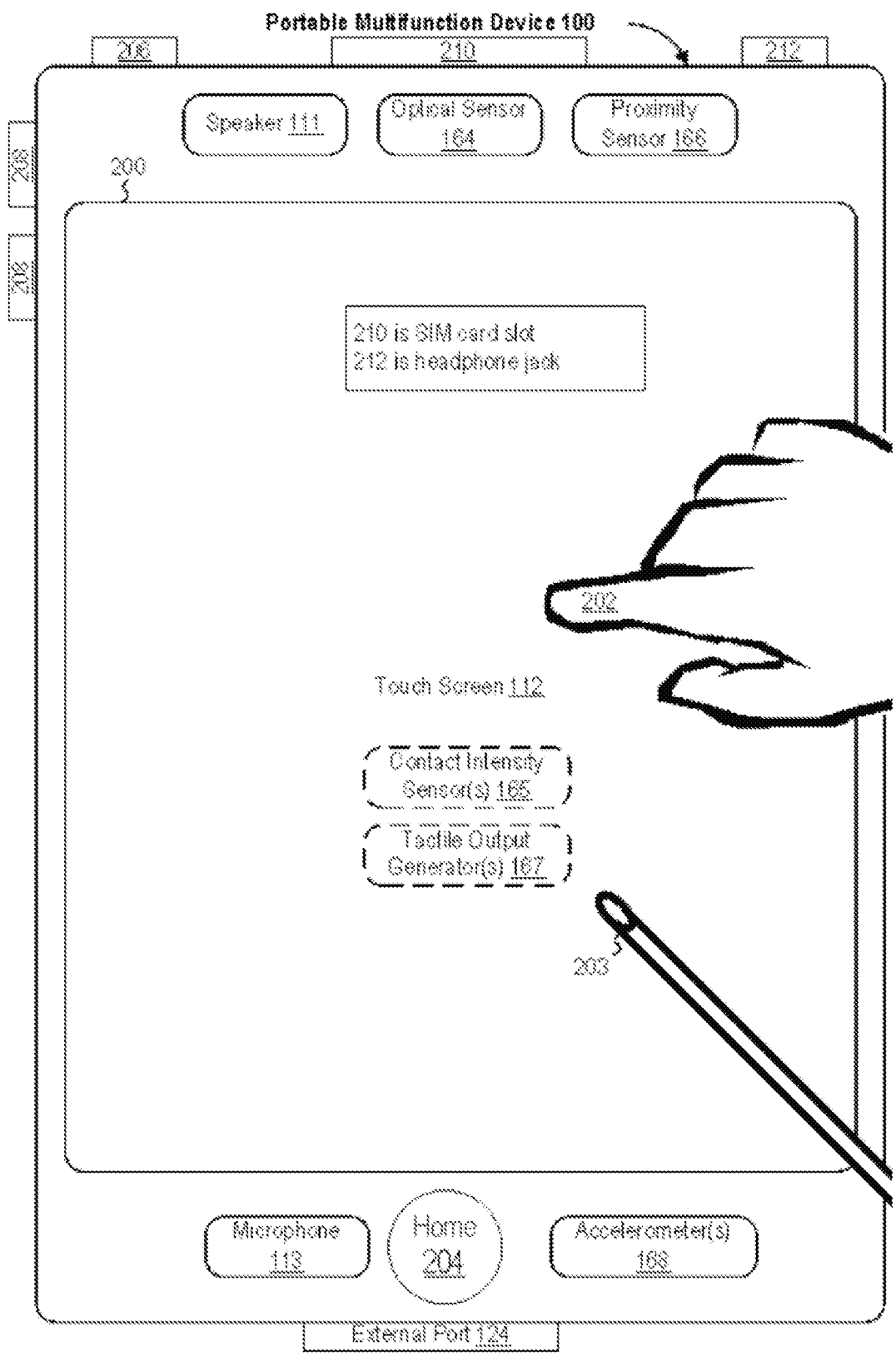
FIG. 2 illustrates a portable multifunction device having a touch-sensitive display in accordance with some examples.
Figure 3:
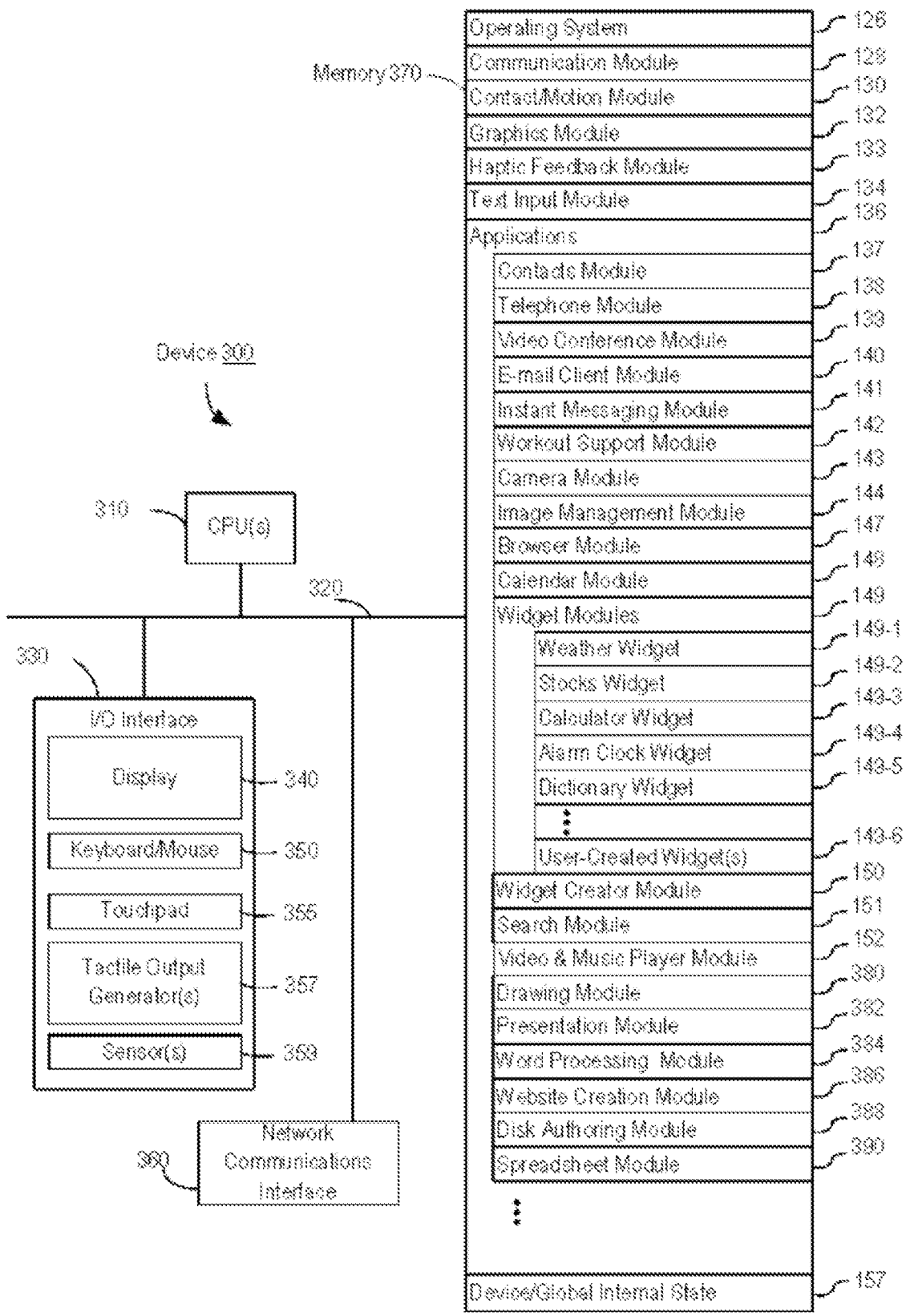
FIG. 3 is a block diagram of an exemplary multifunction device with a display and a touch-sensitive surface in accordance with some examples.
Figure 4A:
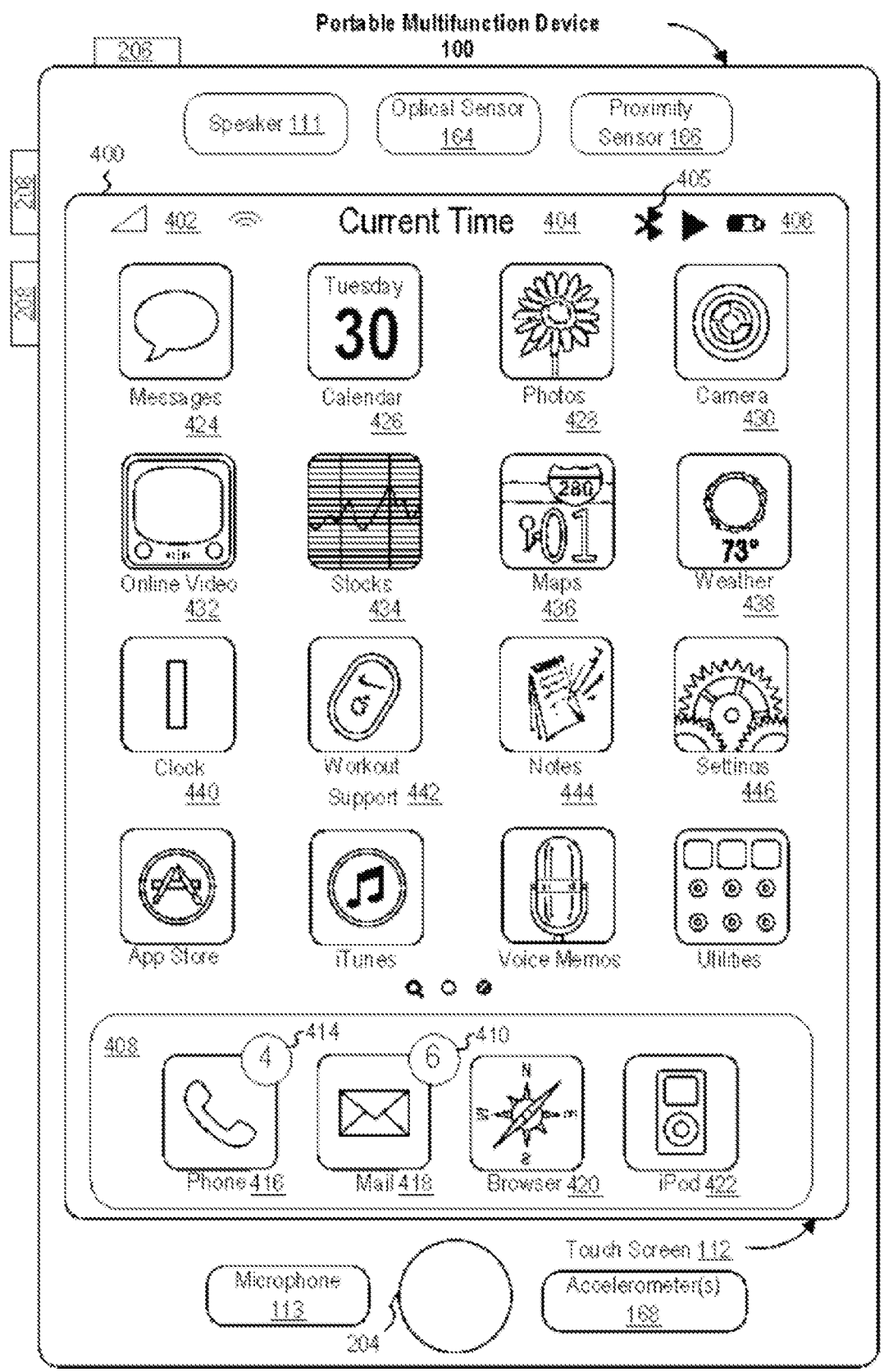
FIG. 4A illustrates an exemplary user interface for a menu of applications on a portable multifunction device in accordance with some embodiments.

Below, FIGS. 1A-1B, 2, 3, and 5A-5B provide a description of exemplary devices for performing the techniques for limiting notifications and alerts on an electronic device. FIGS. 4A-4B illustrate exemplary user interfaces that can be displayed on these exemplary devices.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described.

It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
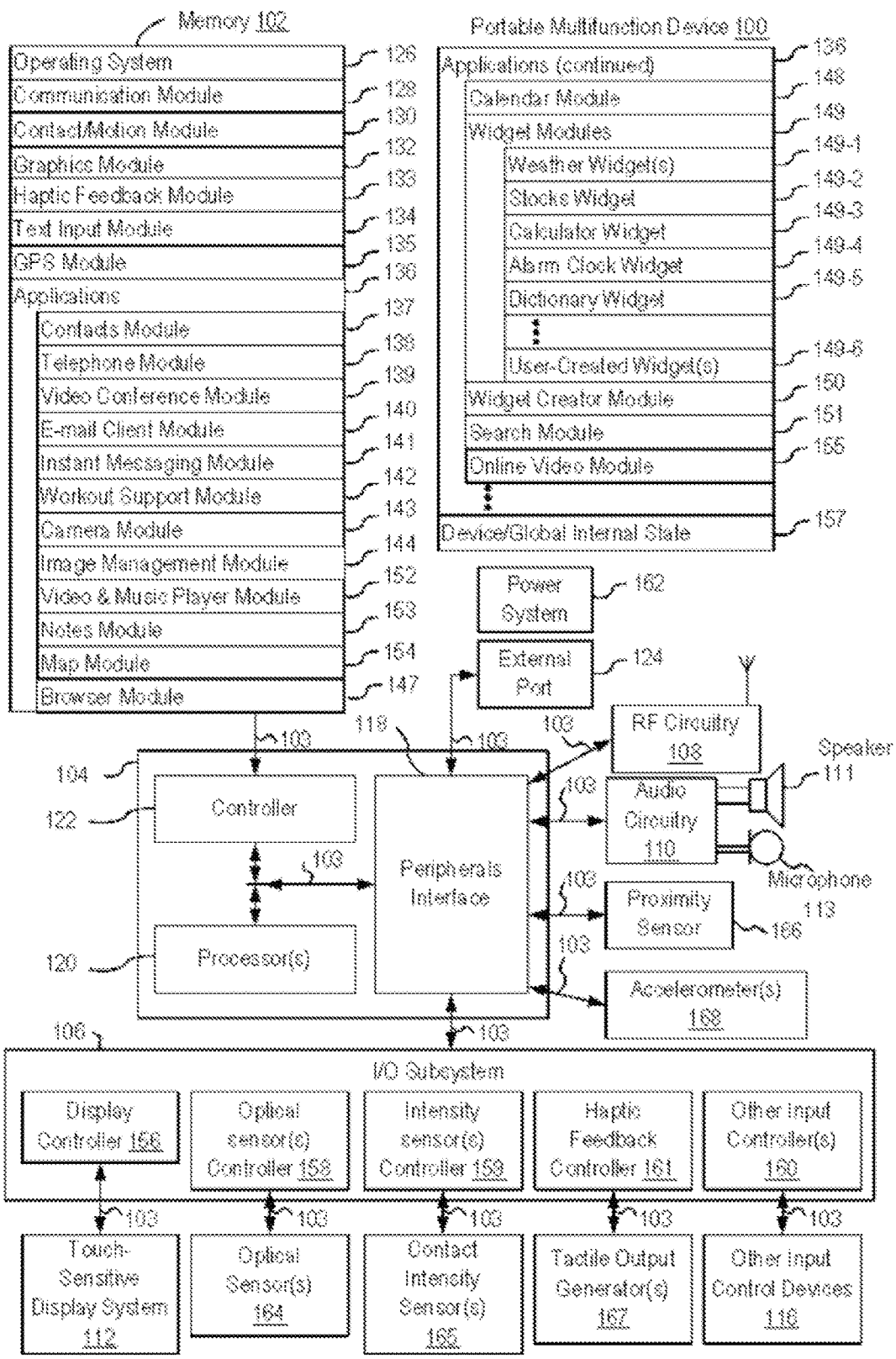
FIG. 1A is a block diagram illustrating a portable multifunction device with a touch-sensitive display in accordance with some examples.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web-pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
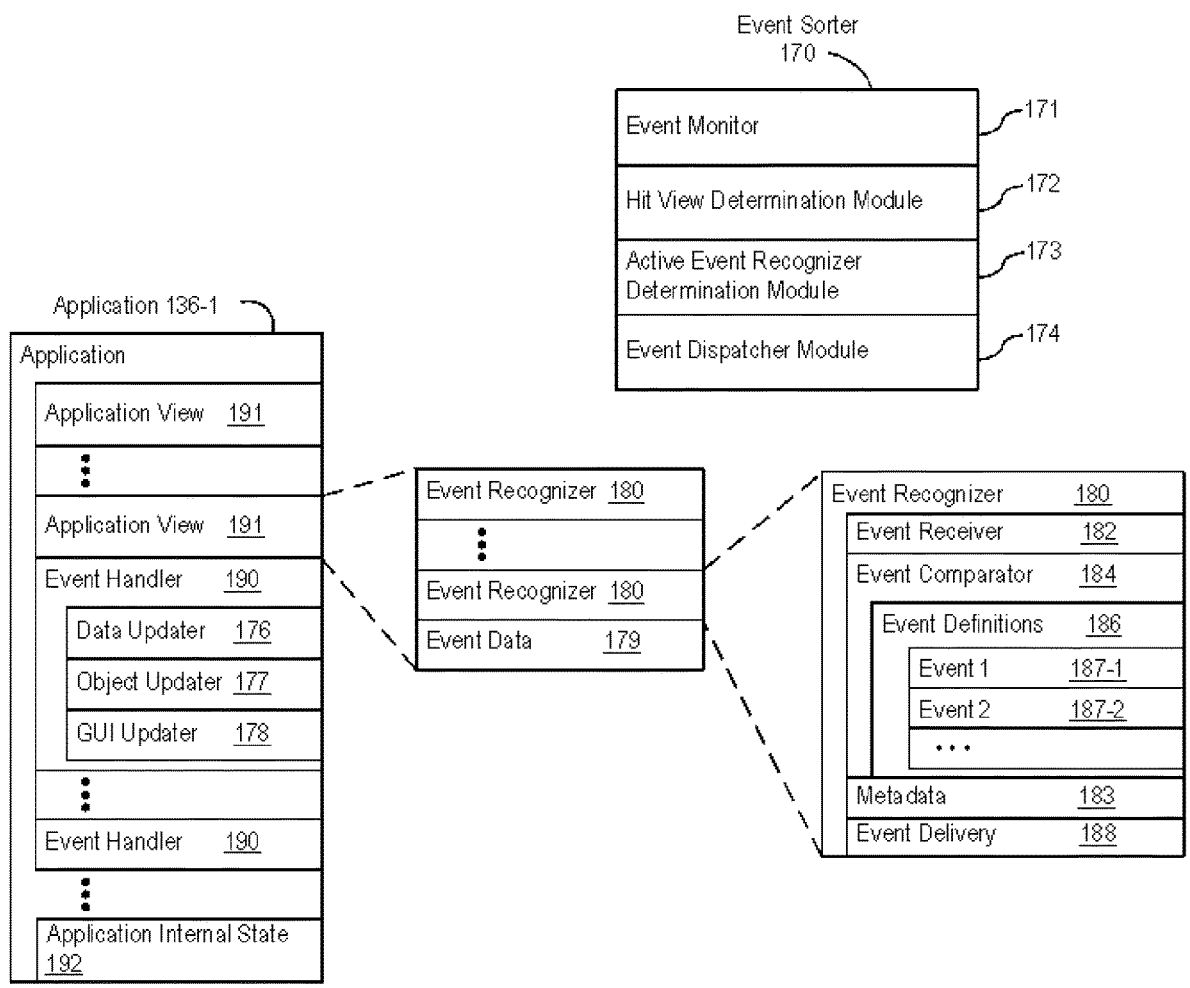
FIG. 1B is a block diagram illustrating exemplary components for event handling in accordance with some examples.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
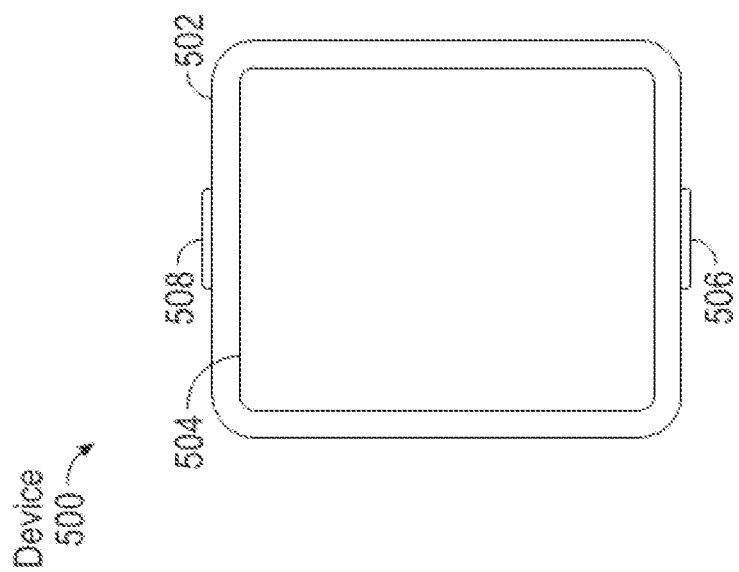
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500. As used here, the term "intensity" of a contact (or touch) on touchscreen 504 (or the touch-sensitive surface) refers to the force or pressure (force per unit area) of a touch (e.g., a finger) on the touchscreen.

In some embodiments, touchscreen 504 (or the touch-sensitive surface) does not have the above-described intensity sensors; rather, device 504 uses a substitute (proxy) for the force or pressure of a contact on touchscreen 504. In these embodiments, the size of the contact area detected on the touchscreen 504 and/or changes thereto, the capacitance of the touchscreen 504 proximate to the contact and/or changes thereto, and/or the resistance of the touchscreen 504 proximate to the contact and/or changes thereto can be used as a substitute for the force or pressure of the contact on touchscreen 504. These substitute measurements for contact force or pressure may be used directly to determine whether an intensity threshold has been exceeded (e.g., the intensity threshold is described in units corresponding to the substitute measurements). Alternatively, these substitute measurements for touch force or pressure may be converted to an estimated force or pressure and the estimated force or pressure may then be used to determine whether an intensity threshold has been exceeded (e.g., the intensity threshold is a pressure threshold measured in units of pressure).

In some embodiments, regardless of whether touchscreen 504 (or the touch-sensitive surface) has the above-described intensity sensors, device 500 can optionally communicate with a stylus having a pressure-sensitive tip that detects and provides data regarding the intensity of the stylus's touch on device 500, particularly touchscreen 504.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
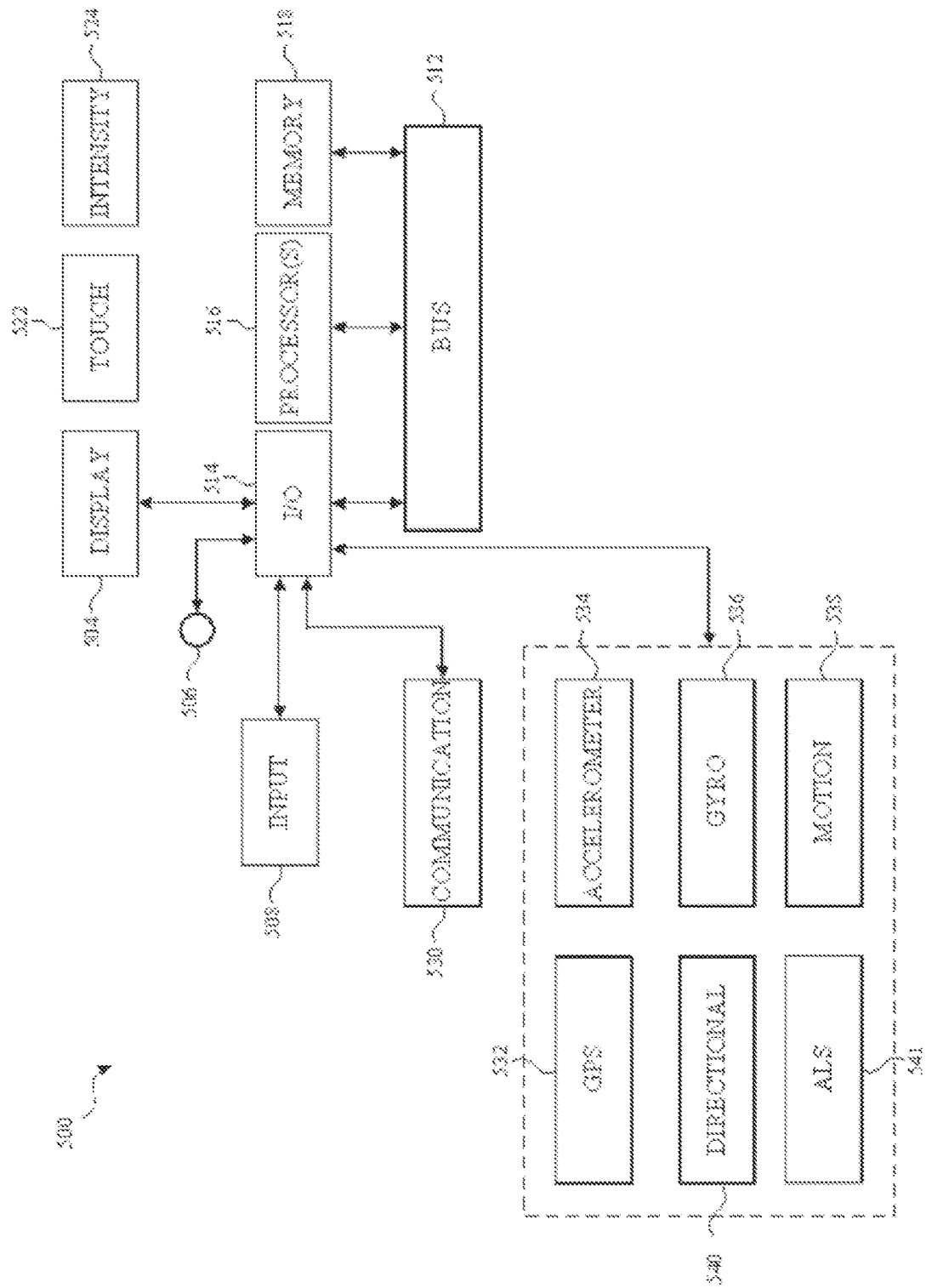
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, ambient light sensor (ALS) 541, and/or a combination thereof, all of which can be operatively connected to I/O section 514.

Memory 518 of personal electronic device 500 can be a non-transitory computer readable storage medium, for storing computer-executable instructions, which, when executed by one or more computer processors 516, for example, can cause the computer processors to perform the techniques described above, including processes 600 and 700 (FIGS. 6 and 7). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
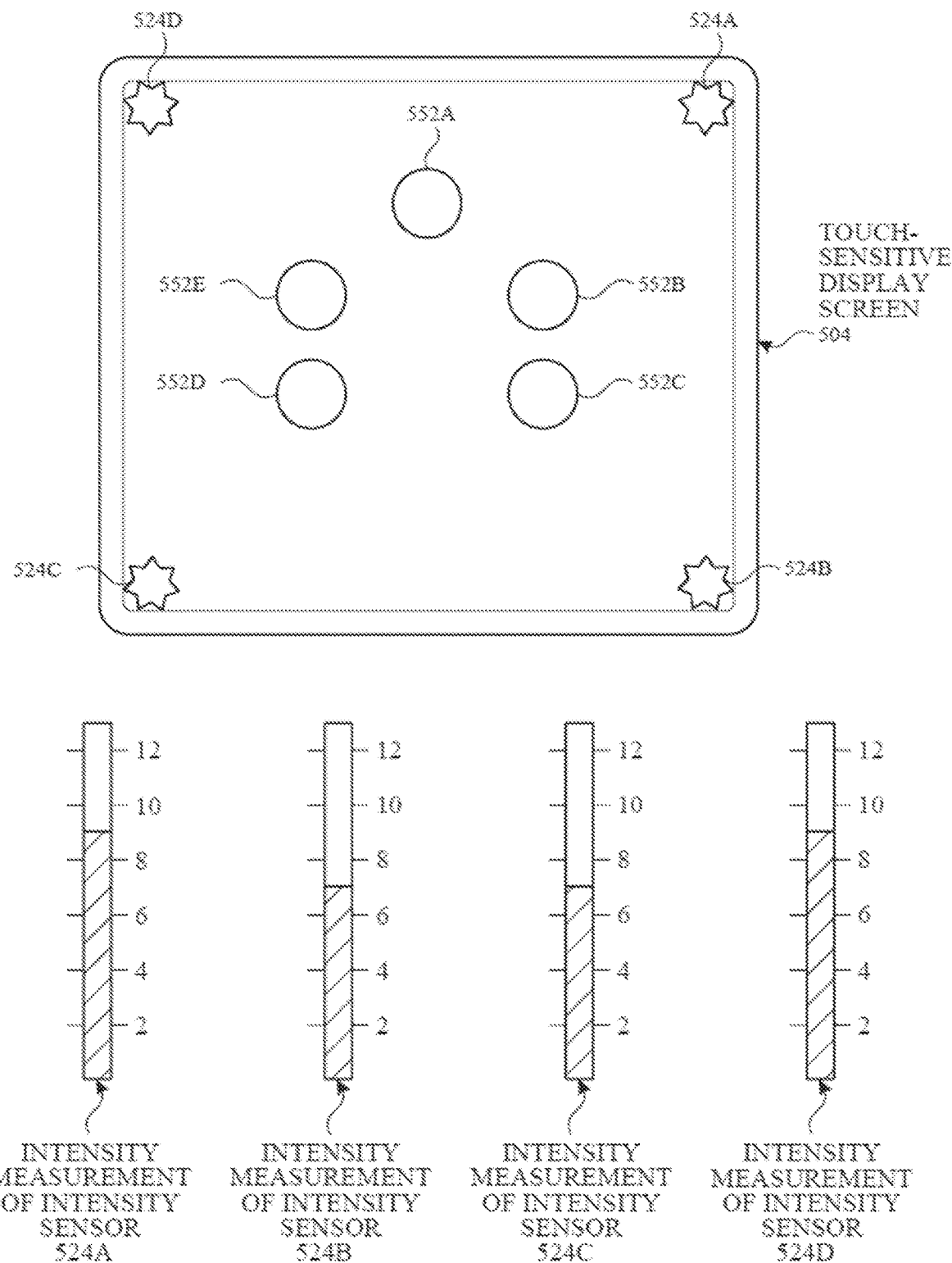
FIGS. 5C-5D illustrate exemplary components of a personal electronic device having a touch-sensitive display and intensity sensors in accordance with some embodiments.
Figure 5D:
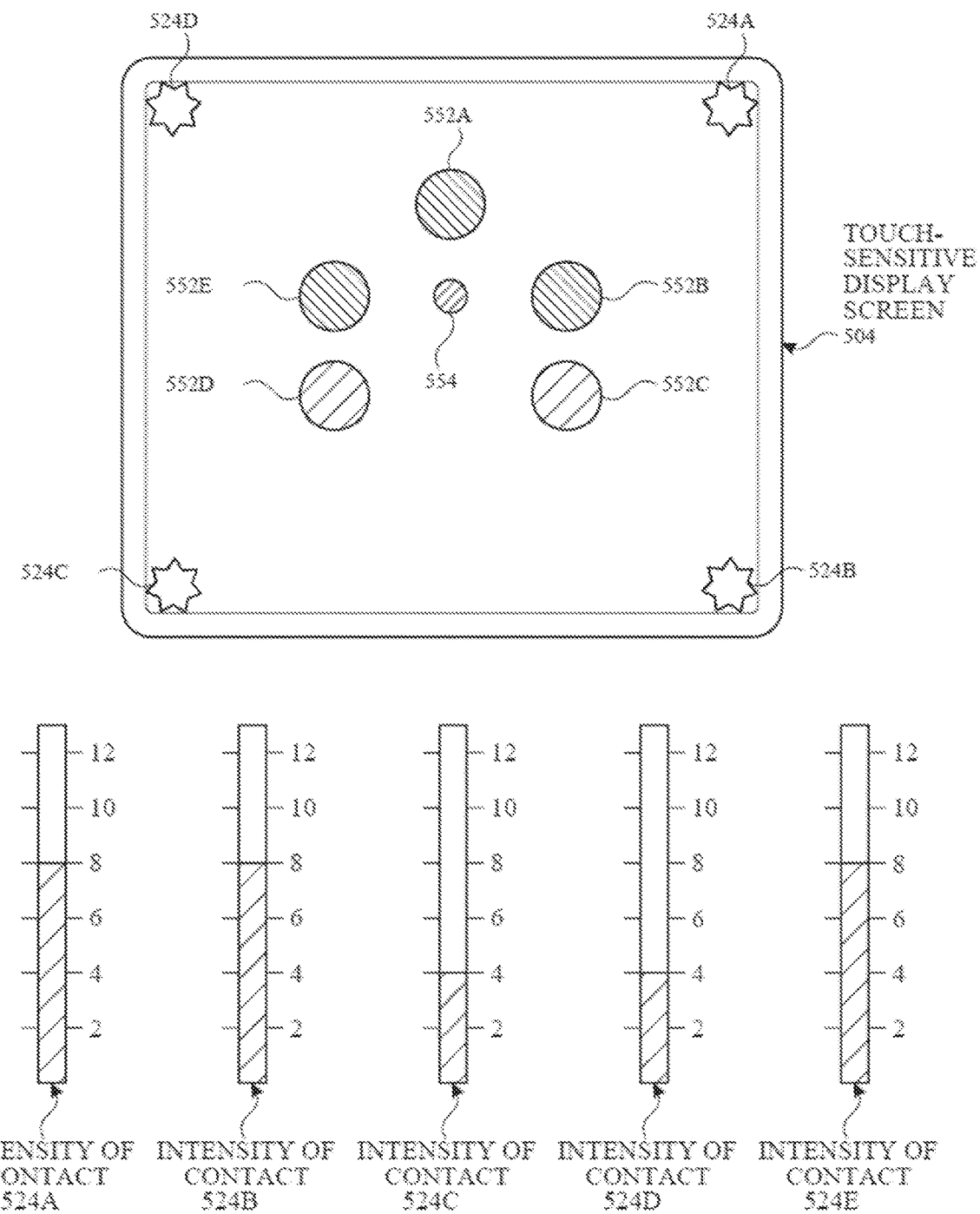

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

an active application, which is currently displayed on a display screen of the device that the application is being used on;

a background application (or background processes) which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

FIG. 6 illustrates an exemplary process 600 for limiting notifications on an electronic device according to various examples. In some examples, process 600 can be performed using an electronic device similar or identical to device 100, 300, or 500.

At block 602, one or more processors (e.g., processors 120, CPU(s) 310, or processor(s) 516) of the electronic device can receive data representing a user input. In some examples, the data representing the user input can include touch data from a touch-sensitive display (e.g., touch-sensitive display 112, 340, or 504). The touch data can include data indicating locations on the touch-sensitive display at which a touch is detected by the touch-sensitive display. In other examples, the data representing the user input can additionally or alternatively include ambient light data from an ambient light sensor (e.g., proximity sensor 166, sensor(s) 359, or ALS 541) that represents an amount of light detected by the ambient light sensor. In yet other examples, the data representing the user input can additionally or alternatively include motion data from a motion sensor, such as an accelerometer or gyroscope (e.g., accelerometer(s) 168, sensor(s) 359, gyroscope 536, or motion sensor 538). In yet other examples, the data representing the user input can additionally or alternatively include intensity data from a contact intensity sensor (e.g., contact intensity sensor 165, sensor(s) 359, intensity sensor 524) that measures the amount of force or pressure applied to the touch-sensitive display of the electronic device.

At block 604, the one or more processors of the electronic device can determine, based on the data received at block 602, whether the user input is a cover gesture over the touch-sensitive display of the device. The cover gesture can include a gesture in which the user of the electronic device places their hand (or other object) over at least a portion of the touch-sensitive display. For example, for a wearable electronic device worn on a user's wrist (e.g., device 500), the user may place the hand opposite the hand wearing the device over the touch-sensitive display of the electronic device to perform the cover gesture. This cover gesture can indicate that the user would like to place the electronic device in a DND mode.

The one or more processors of the electronic device can determine whether the user input represented by the data received at block 602 is a cover gesture in numerous ways. In some examples where the data received at block 602 includes touch data from a touch-sensitive display, determining whether the user input is a cover gesture can include determining whether a touch has been detected at a threshold amount of the touch-sensitive display. In these examples, the user input can be determined to be a cover gesture in response to determining that a touch has been detected at the threshold amount or more of the touch-sensitive display, while the user input may be determined to not be a cover gesture in response to determining that a touch at the threshold amount of the touch-sensitive display has not been detected. The threshold amount of the touch-sensitive display can be 25%, 50%, 75%, or any other desired portion of the touch-sensitive display. In some examples, to determine the amount of the touch-sensitive display at which a touch has been detected, a number of touch nodes (e.g., discrete locations at which the touch-sensor of the touch-sensitive display can detect touches) detecting a touch can be divided by the total number of touch nodes of the touch-sensor.

In other examples where the data received at block 602 includes touch data from a touch-sensitive display, determining whether the user input is a cover gesture can include determining whether a touch has been detected at a predetermined portion of the touch-sensitive display. In these examples, the user input can be determined to be a cover gesture in response to determining that a touch has been detected at the predetermined portion of the touch-sensitive display, while the user input may be determined to not be a cover gesture in response to determining that a touch at the predetermined portion of the touch-sensitive display has not been detected. The predetermined portion can include the center 10%, 20%, 30%, or the like, of the touch-sensitive display. In some examples, the predetermined portion of the touch-sensitive display can include a predetermined set of touch nodes. For example, the predetermined set of touch nodes can include a contiguous or non-contiguous set of any desired number of touch nodes located on a portion of the touch-sensitive display. The predetermined set of touch nodes can be selected to be touch nodes in areas of the touch-sensitive display at which a typical cover gesture (e.g., when a user's hand or other object is placed over the display of the device) would result in touches being detected by the touch-sensitive display. In these examples, determining whether the user input is a cover gesture can include determining whether a touch has been detected at each of the predetermined set of touch nodes.

In other examples where the data received at block 602 includes ambient light data from an ambient light sensor, determining whether the user input is a cover gesture can include determining, based on the ambient light data, whether the amount of light received by the ambient light sensor is below a threshold light value. In these examples, the user input can be determined to be a cover gesture in response to determining that the amount of light received by the ambient light sensor is below the threshold light value, while the user input may be determined to not be a cover gesture in response to determining that the amount of light received by the ambient light sensor is not below the threshold light value. The threshold value can depend on the ambient light sensor used and its placement on the electronic device, but can generally represent a value that corresponds to the amount of light typically expected to be received by the ambient light sensor when a user's hand or other object is placed over the display of the device.

In other examples where the data received at block 602 includes motion data from one or more motion sensors, determining whether the user input is a cover gesture can include determining, based on the motion data, whether a threshold amount of motion has been detected within a predetermined length of time after a notification event. In these examples, the user input can be determined to be a cover gesture in response to determining that a threshold amount of motion has been detected within a predetermined length of time after a notification event, while the user input may be determined to not be a cover gesture in response to determining that a threshold amount of motion within the predetermined length of time after a notification event has not been detected. The threshold amount of motion can depend on the motion sensor(s) used and their placement on the electronic device, but can generally represent a value that corresponds to the amount of motion typically expected to be detected by the motion sensor(s) when a user places their hand or other object over the display of the device. For example, a sudden acceleration associated with a user placing a hand over the screen may be detected. Since the electronic device can be moved for any number of reasons (e.g., a wearable electronic device can be moved whenever a user moves), the time limitation relative to the notification event can be used in addition to the motion data to detect the cover gesture so that it can be more reliably determined that the detected motion of the device is caused by the user performing a cover gesture (e.g., in response to the electronic device presenting an unwanted notification), rather than motion caused by normal use (e.g., the user swinging their arm while wearing the electronic device, the user bumping into an object, the user setting their arm down on a table, or the like). The notification event can include any notification presented to the user by the electronic device. For example, the notification can include a display of text or an image, an audible noise, a haptic output, or combinations thereof. The predetermined length of time can be selected to be any desired value. For example, the predetermined length of time can be selected to provide the user with sufficient time to react to the notification event by performing the cover gesture. The predetermined length of time can further be selected to be limited in duration such that a cover gesture (or other motion that could be interpreted as a cover gesture) is not mistakenly associated with the notification event. For example, the predetermined length of time can be selected to be 1 second, 2 seconds, etc., to allow a user sitting in a movie theatre sufficient time to cover their electronic device in response to the electronic device outputting a ringing noise to notify the user of the receipt of a text message.

In other examples where the data received at block 602 includes intensity data representing a characteristic intensity of a contact detected by contact intensity sensor, determining whether the user input is a cover gesture can include determining, based on the intensity data, whether the characteristic intensity of the contact is above a threshold intensity. In these examples, the user input can be determined to be a cover gesture in response to determining that the characteristic intensity of a contact is above a threshold intensity, while the user input may be determined to not be a cover gesture in response to determining that the characteristic intensity of the contact is not above the threshold intensity. The threshold intensity can depend on the contact intensity sensor(s) used and their placement on the electronic device, but can generally represent a value that corresponds to the characteristic intensity of a contact typically expected to be detected by the contact intensity sensor(s) when a user places their hand or other object over the display of the device or when a user squeezes the display of the electronic device against their wrist. Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application," filed May 8, 2013 and International Patent Application Serial No. PCT/US2013/069483, entitled "Device, Method, and Graphical User Interface for Transitioning Between Touch Input to Display Output Relationships," filed Nov. 11, 2013.

In some examples, determining whether the user input is a cover gesture can include the use of any combination of the touch data from the touch-sensitive display, the ambient light data from the ambient light sensor, intensity data from the contact intensity sensor, and the motion data from the one or more motion sensors. For example, determining whether the user input is a cover gesture can include determining whether a touch has been detected at a threshold amount of the touch-sensitive display, whether a touch has been detected at a predetermined portion of the touch-sensitive display, whether the amount of light received by the ambient light sensor is below a threshold light value, whether a characteristic intensity of a contact detected by the contact intensity sensor is above a threshold intensity, whether a threshold amount of motion has been detected within a predetermined length of time after a notification event, or combinations thereof.

At block 606, if it was determined at block 604 that the user input is not a cover gesture, the process can return to block 602, where additional data representing a user input can be received. Blocks 602, 604, and 606 can repeatedly be performed to determine whether a cover gesture has occurred. If it is instead determined at block 604 that the user input is a cover gesture, the process can proceed from block 606 to block 608.

At block 608, the one or more processors of the electronic device can cause the electronic device to enter a DND mode. In some examples, while in the DND mode, the one or more processors can cease to present a notification in response to any notification triggering event, such as the receipt of a text message, receipt of an email, receipt of a phone call, the occurrence of an event associated with an application running on the electronic device, an event scheduled in the user's calendar, or the like. In other examples, while in the DND mode, the one or more processors can cease to present a notification in response to certain types of notification triggering events, such as the receipt of a text message, receipt of an email, receipt of a phone call, the occurrence of an event associated with an application running on the electronic device, an event scheduled in the user's calendar, or the like, but can present a notification in response to other types of notification triggering events, such as the receipt of a high-priority text message, receipt of a high-priority email, or receipt of a high-priority phone call. In yet other examples, while in the DND mode, the one or more processors can cease to present all types of notifications, such as a display of text or an image, an audible noise, or a haptic output. In other examples, while in the DND mode, the one or more processors can cease to present some types of notifications, such as an audible noise or a haptic output, but can continue to present other types of notification, such as the display of text or an image.

In some examples, block 608 can further include determining a time at which the electronic device will exit the DND mode. This time can be expressed as either a length of time that the electronic device will remain in the DND mode (e.g., remain in DND mode for one hour) or a termination time at which the electronic device will exit the DND mode (e.g., exit the DND mode at 12:31 p.m.). In some examples, a default value (e.g., 1 hour, 2 hours, 3 hours etc.) can be used to determine a default length of time that the electronic device will remain in the DND mode or to determine a default termination time. For example, the default length of time that the electronic device will remain in the DND mode can be set to the default value or the default termination time can be set to be a time equal to the default time after the electronic device enters the DND mode.

In other examples, contextual data, such as calendar data associated with the user, a list of tickets purchased by the user, a location of the user, an activity being performed by the user, a velocity of the user, a connectivity state of the electronic device, or the like, can be used to determine a custom time at which the electronic device will exit the DND mode. For example, the user's calendar or the list of tickets purchased by the user can be used to determine an event being attended by the user (e.g., a meeting, a concert, etc.). The end time of the event, as determined by the user's calendar and/or the associated ticket, can be used to set the time at which the electronic device exits the DND mode. For example, a custom length of time that the user device will remain in the DND mode can be set to be equal to a difference between the time that the electronic device enters the DND mode and the end time of the event. Additionally or alternatively, a custom termination time at which the electronic device exits the DND mode can be set to be equal to the end time of the event. The location of the user, velocity of the user, and connectivity state of the electronic device (e.g., Bluetooth connection to a car or other electronic device) can be used to determine an activity being performed by the user (e.g., driving, watching a movie, sitting at a desk at work, etc.). This information can similarly be used to generate a custom length of time that the electronic device will remain in the DND mode or the custom termination time that the electronic device will exit the DND mode based on an expected end time of the activity. For example, a user may not want to be disturbed by alerts while driving, and in response to detection of the cover gesture and concurrent pairing of the device to the car via Bluetooth (or other protocol), or a determination that the device is moving faster than a predetermined speed, or both, the device will remain in DND mode until the pairing is no longer present/detected or the speed is below a predetermined speed, or both. Speed may be detected directly, as reported from the vehicle, or indirectly by calculating a speed from GPS position data. In another example, detection of a particular network or beacon, such as an iBeacon™, may cause the device to enter the DND mode for the duration that the network or beacon is detected. In other examples, GPS position data can be used to determine that the user is at a location where they may not want to be disturbed (e.g., at their work office, at the movies, etc.). In these examples, the electronic device can remain in the DND mode until it is determined that the user is no longer at the location.

In some examples, determining the time at which the electronic device will exit the DND mode at block 608 can include determining whether there is sufficient contextual data to generate a custom length of time that the electronic device will remain in the DND mode or the custom termination time at which the electronic device will exit the DND mode. This can include, for example, determining if there is sufficient contextual data to determine an event being attended by the user and an end time of the event. If there is sufficient contextual data to generate the custom length of time or the custom termination time, the custom value can be used to determine when the electronic device exits the DND mode. Alternatively, if there is not sufficient contextual data to generate the custom length of time or the custom termination time, the default length of time or default termination time can be used to determine when the electronic device exits the DND mode.

In some embodiments, the electronic device may provide other functionality in response to a cover gesture. For example, in response to a cover gesture, the electronic device may display one or more predetermined screens, such as a display of a plurality of icons configured to launch one or more applications when activated or a clock display screen, or may disable a display of the electronic device. In some embodiments, returning to a predetermined screen (e.g., a home screen) in response to a cover gesture may provide a user with convenient mechanism for returning to an often-used screen regardless of the currently displayed screen or activity being performed on the device and increases the efficiency of the man-machine interface by allowing a single gesture to perform an action that would otherwise require multiple user inputs (e.g., if a user is deep within an interface hierarchy and desires to return to the top level or another interface outside the hierarchy).

In some embodiments, the electronic device determines the duration of a cover gesture. If the electronic device determines that duration of the cover gesture is greater than a threshold duration, the electronic device may enter a first mode (e.g., the DND mode), display a predetermined screen (e.g., a home screen), as described, or otherwise perform a predetermined action. If the electronic device determines that the duration of the cover gesture is not greater than the threshold, the electronic device may not perform an action or perform an action other than that performed when the duration of the cover gesture is greater than a threshold direction. For example, in response to a determination that the duration of a cover gesture is greater than the threshold, the electronic device may enter DND mode and in response to a determination that the duration of a cover gesture is less than a threshold duration, the device may display a predetermined home screen.

In some examples, the electronic device performing process 600 can be associated with another electronic device. For example, process 600 can be performed by a wearable electronic device 500, but can also be associated with a mobile phone, tablet device, laptop computer, or the like. The devices can be associated together by virtue of being owned by the same user, by being associated with the same user account, or the like. In these examples, block 608 can further include transmitting a notification to the associated electronic device indicating that a cover gesture has been detected and that the electronic device will be entering the DND mode. In some examples, the associated electronic device can also enter the DND mode in response to receiving the notification. The DND mode entered by the associated electronic device can be the same DND mode entered by the electronic device performing process 600 or can be a modified version of the DND mode. For example, the electronic device performing process 600 can enter a DND mode in which all notifications cease to be presented by the electronic device. The associated electronic device, however, can enter a modified DND mode in which some of the notifications cease to be presented to the user, while others can still be presented to the user. In other examples, the associated electronic device can be placed into the DND mode using a process similar to process 600 or any other desired mechanism (e.g., a settings option). In these examples, the associated electronic device can transmit a notification to the electronic device indicating that the associated electronic device will be entering the DND mode. In some examples, the electronic device can also enter the DND mode in response to receiving the notification.

Using process 600, an electronic device advantageously allows a user to place the electronic device into a DND mode by simply placing their hand or other object over the touch-sensitive display of the device. The electronic device can remain in the DND mode for a default or custom length of time after which the electronic device can automatically return to a normal mode of operation. This provides the benefit of not requiring the user to remember to remove the electronic device from the DND mode, which can prevent the user from missing an important notification.

Figure 8:
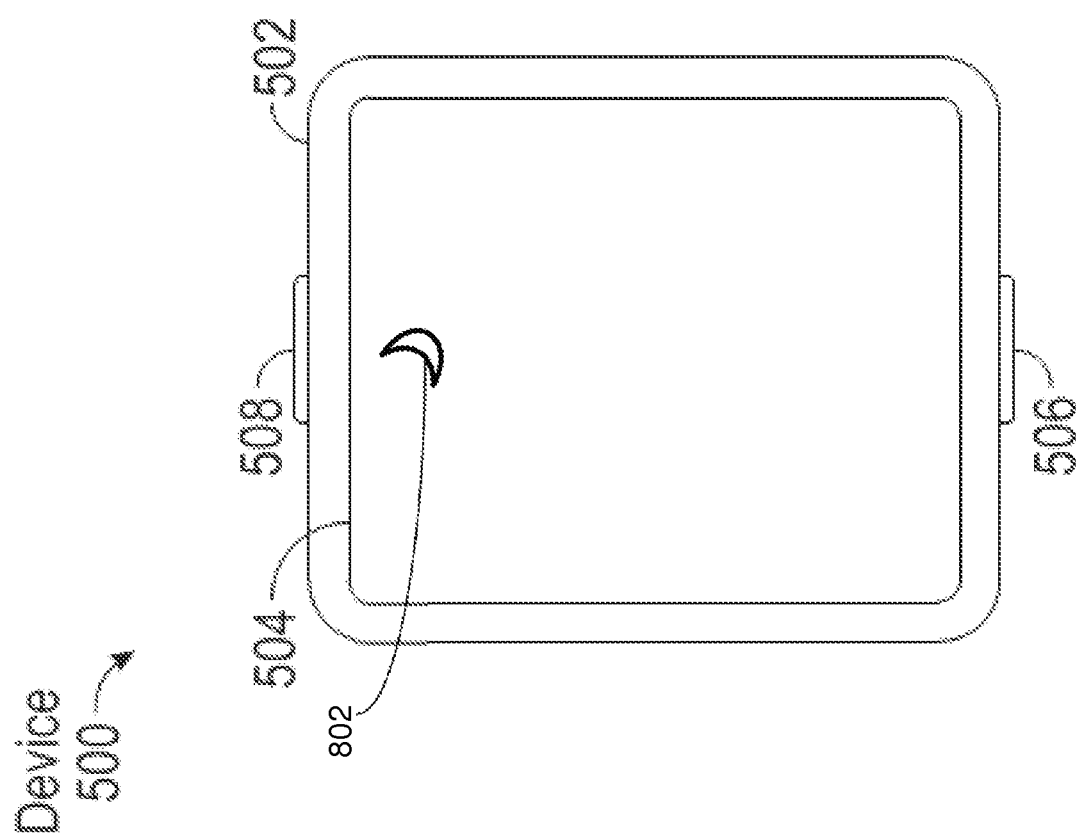
FIGS. 8-11 illustrate example interfaces for displaying and controlling the DND status of an electronic device in accordance with some examples.

In some examples, as shown in FIG. 8, the one or more processors of the electronic device can cause the touch-sensitive display of the electronic device to display a DND indicator 802 that informs the user that the electronic device is in the DND mode. The DND indicator can include any desired graphic, such as a moon, a colored dot, a text description of the device's state, or the like. In some examples, a selection of the DND indicator (e.g., by a user touching a portion of the touch-sensitive display corresponding to the DND indicator) can cause the electronic device to exit the DND mode.

Figure 9:
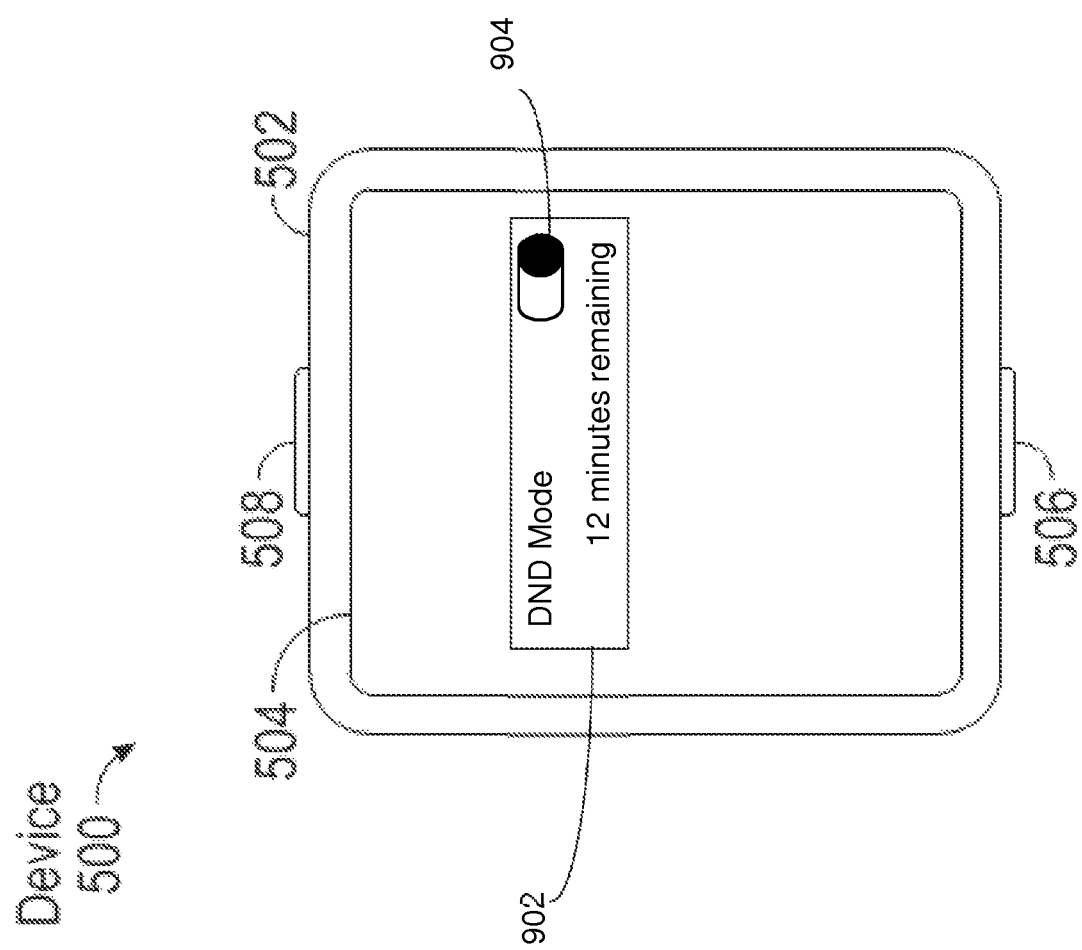

In some examples, as shown in FIG. 9, the one or more processors of the electronic device can cause the touch-sensitive display of the electronic device to display a DND settings menu option 902 having a selectable element 904 that indicates the DND state of the electronic device. When in the DND mode, DND settings menu option 902 can further indicate the time remaining before the electronic device will exit the DND mode. In some examples, the one or more processors of the electronic device can cause the electronic device to enter or exit the DND mode in response to a user selection of selectable element 904.

Figure 10:
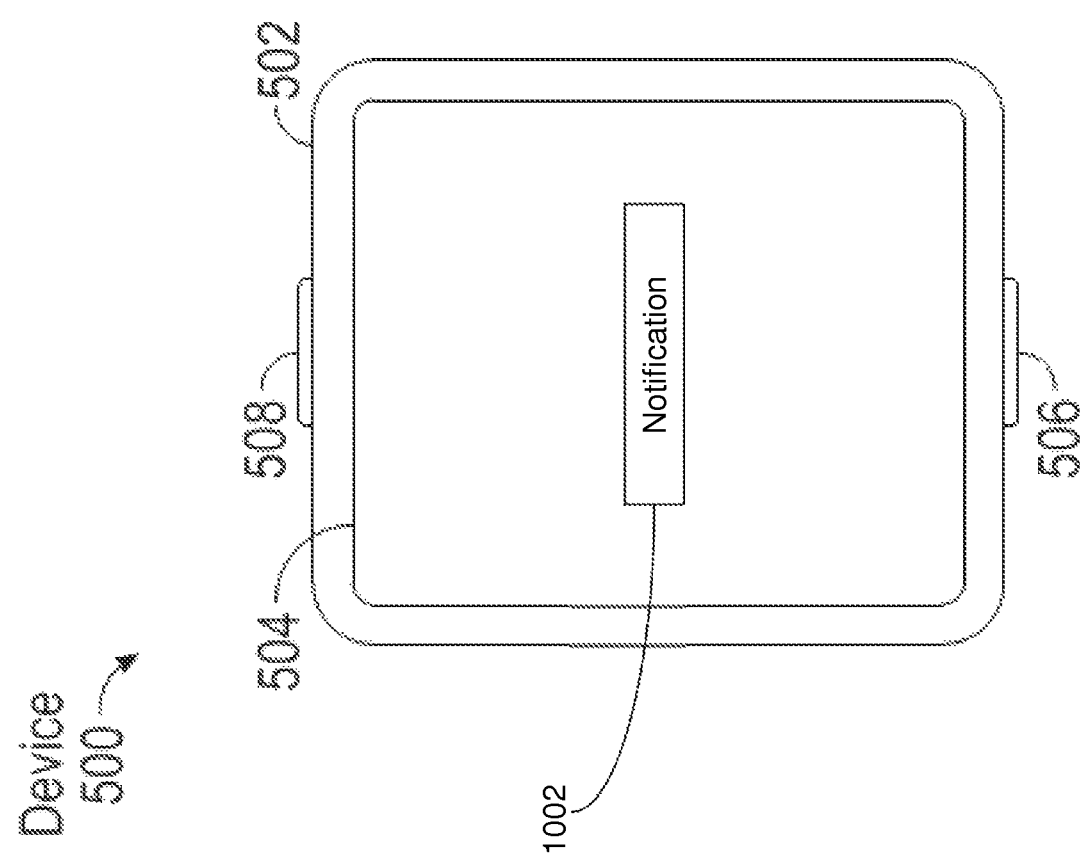
Figure 11:
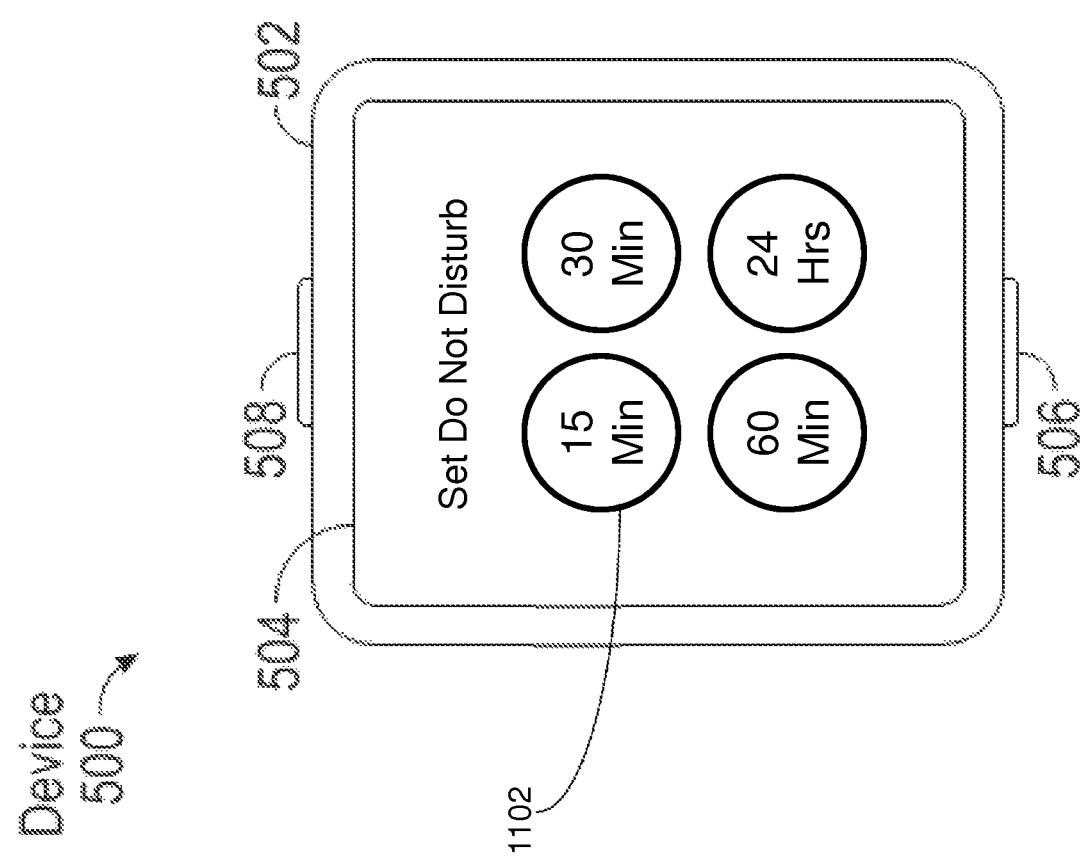

In some examples, the electronic device can be placed into the DND mode in other ways. For example, as shown in FIG. 10, the one or more processors of the electronic device can cause a display of a notification message 1002 indicating that an event of interest has occurred. In response to a user input, such as a tap on touch-sensitive display 504, a press having a threshold intensity on touch-sensitive display 504, a swipe across touch-sensitive display 504, or the like, the one or more processors of the electronic device can cause a display of a DND interface similar to that shown in FIG. 11. The DND interface can include selectable options 1102 that, when selected by a user, can cause the electronic device to enter the DND mode for a length of time corresponding to the selected selectable option 1102. It should be appreciated that the values shown in FIG. 11 are provided as examples and that any other values can be used.

Figure 7:
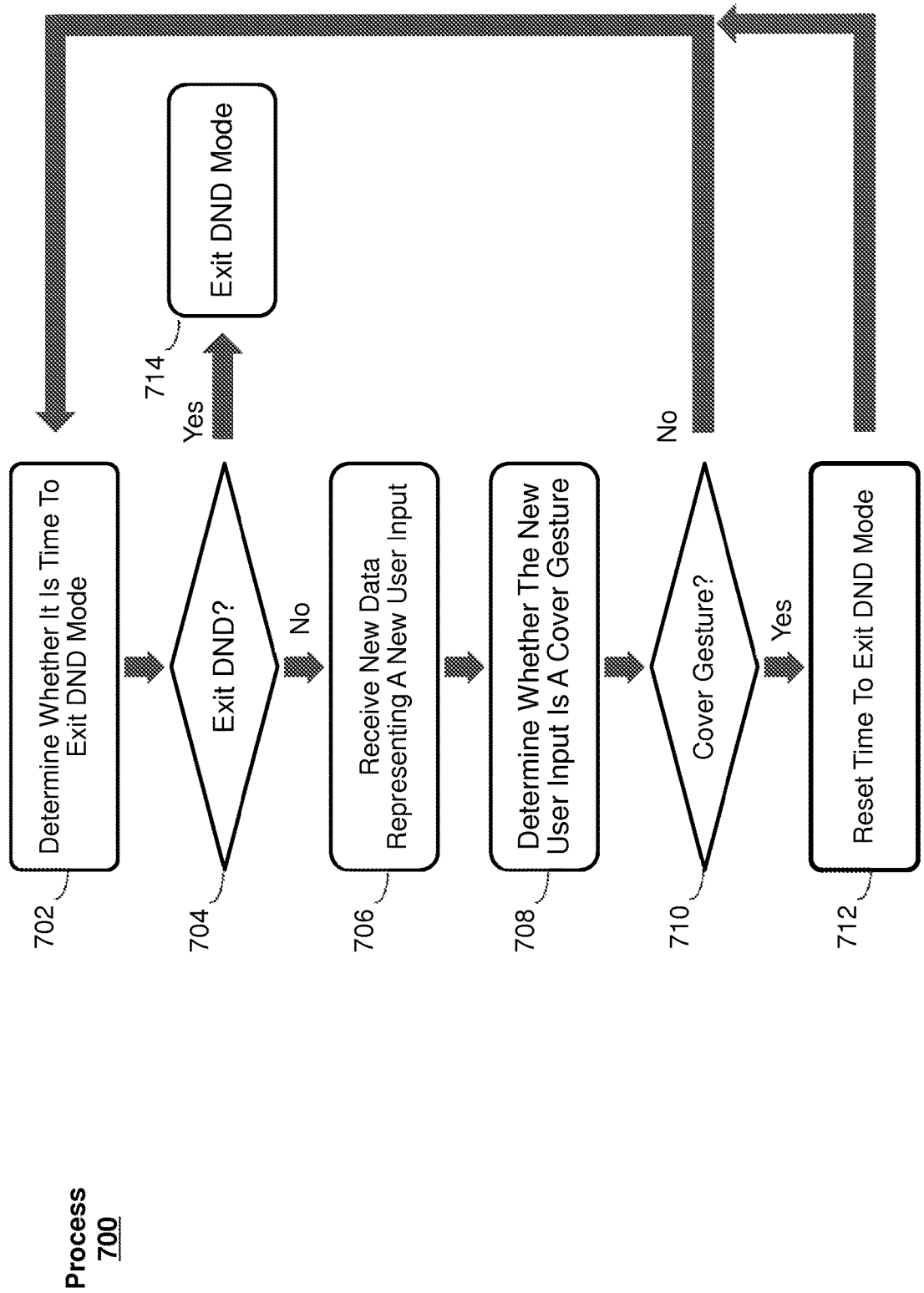
FIG. 7 is a flow diagram illustrating another process for limiting notifications on an electronic device in accordance with some examples.

FIG. 7 illustrates exemplary process 700 that can be performed after process 600 is performed and while the electronic device is in the DND mode. At block 702, the one or more processors of the electronic device can determine whether it is time to exit the DND mode. In some examples where block 608 included determining a length of time (custom or default) that the electronic device is to remain in the DND mode, block 702 can include determining whether the length of time has expired. In other examples where block 608 included determining a termination time (default or custom) at which the electronic device is to exit the DND mode, block 608 can include determining whether a current time is equal to or greater than the termination time.

At block 704, if it was determined at block 702 that it is time to exit the DND mode, process 700 can proceed to block 714 where the one or more processors of the electronic device can cause the electronic device to exit the DND mode. As a result, the notifications that ceased to be presented to the user while in the DND mode can be presented to the user and the electronic device can again present new notifications to the user in response to notification triggering events. In some examples where the electronic device performing process 600/700 is associated with another electronic device, block 714 can further include transmitting a notification to the associated electronic device that the electronic device performing process 600/700 is exiting the DND mode. In these examples, the associated electronic device can exit its DND mode in response to receiving the notification. Alternatively, if it was instead determined at block 702 that it is not time to exit the DND mode, process 700 can proceed to block 706.

At block 706, new data representing a new user input can be received in a manner similar or identical to block 602 of process 600. At block 708, it can be determined whether the new user input is a cover gesture in a manner similar or identical to block 604 of process 600. At block 710, if it was determined at block 708 that the new user input is not a cover gesture, the process can return to block 702. Blocks 702, 704, 706, 708, and 710 can repeatedly be performed to determine whether the electronic device should exit the DND mode or if a new cover gesture is received. If it is instead determined at block 708 that the new user input is a cover gesture, process 700 can proceed to block 712.

At block 712, the time to exit the DND mode can be reset by determining an updated time to exit the DND mode. Block 712 can be similar to block 608 of process 600, except that the electronic device is already in the DND mode when block 712 is performed and thus does not need to be placed into the DND mode. For example, a default or custom length of time that the electronic device is to remain in the DND mode or a default or custom termination time at which the electronic device is to exit the DND mode can be determined in a manner similar or identical to that of block 610 of process 600. In this way, a user can cause the electronic device to enter into a DND mode using process 600, and can cause the electronic device to remain in the DND mode for an additional length of time by performing an additional cover gesture before the electronic device exits the DND mode. The additional length of time can be calculated from the previous time that the electronic device was to exit the DND mode determined at block 608, or can be calculated from the time the additional cover gestured was detected at block 708. For example, a user can perform a cover gesture to cause the electronic device to remain in the DND mode for a default length of time of 1 hour (process 600). After a time less than the default length of time, such as 50 minutes, the user can perform an additional cover gesture to instruct the electronic device to remain in the DND mode for an additional length of time. The additional length of time can be 1 hour from the previously determined time that the electronic device was to exit the DND mode (for a total of 2 hours), or can be 1 hour from the time the second cover gesture was received by the electronic device (for a total of 1 hour and 50 minutes). After resetting the time to exit the DND mode at block 712, the process can return to block 702. Blocks 702, 704, 706, 708, 710, and 712 can be repeated any desired number of times to cause the electronic device to remain in the DND mode for any desired length of time.

In some examples, process 700 can further include generating a notification of a predetermined length of time prior to the time that the electronic device is to exit the DND mode. The notification can include any desired type of notification, such as a display of text or an image, an audible noise, a haptic output, or a combination thereof. For example, the notification can include a vibration and the display of the amount of time before the electronic device is to exit the DND mode. The predetermined length of time can be selected to be any value, such as 5 minutes, 10 minutes, 15 minutes, etc. The notification can advantageously inform the user that the device will soon exit the DND mode, allowing the user to decide if he/she would like to instruct the device to remain in the DND for an additional length of time by performing a subsequent cover gesture.

Figure 12:
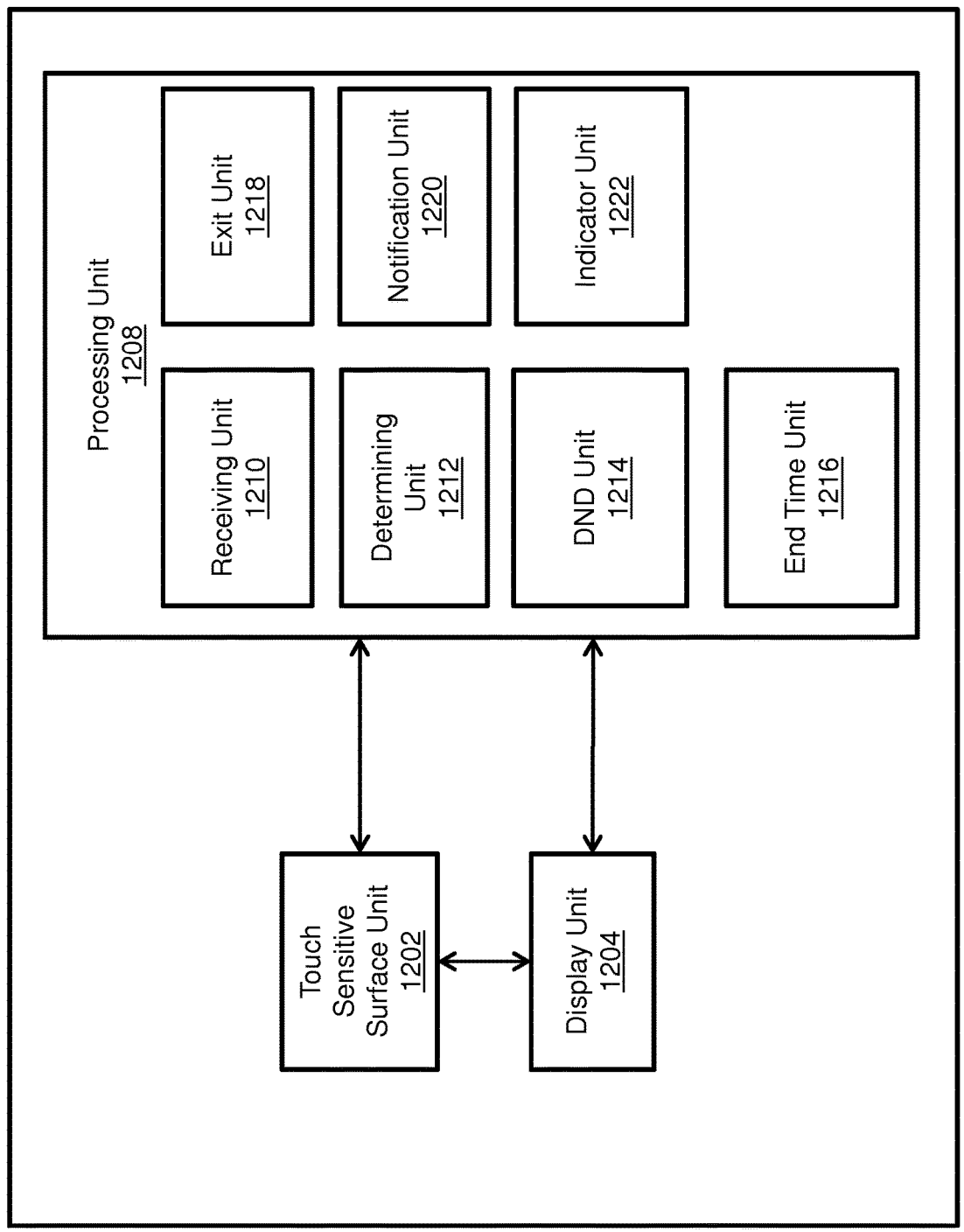
FIG. 12 is a functional block diagram of an electronic device in accordance with some examples.

FIG. 12 shows a functional block diagram of an electronic device 1200 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 12 can be combined or separated into sub-blocks to implement the principles of the various described examples. Therefore, the description herein optionally supports any possible combination or separation or further definition of the functional blocks described herein.

As shown in FIG. 12, electronic device 1200 can include a display unit 1204 configured to display graphical objects, a touch-sensitive surface unit 1202 configured to receive user gestures, and a processing unit 1208. In some examples, processing unit 1208 can include a receiving unit 1210, a determining unit 1212, a DND unit 1214, an end time unit 1216, an exit unit 1218, a notification unit 1220, and an indicator unit 1222.

Processing unit 1208 can be configured to receive data representing a user input (e.g., using receiving unit 1210). Determining unit 1212 can determine, based on the data representing the user input, whether the user input is a cover gesture over a touch-sensitive display (e.g., touch-sensitive surface unit 1202 and display unit 1204). DND unit 1214 can cause, in accordance with a determination that the user input is the cover gesture over the touch-sensitive display, electronic device 1200 to enter a do not disturb (DND) mode.

In some embodiments, the data representing the user input can include touch data output by the touch-sensitive display. In these embodiments, determining unit 1212 can determine whether the user input is the cover gesture over the touch-sensitive display by determining, based on the touch data, whether a touch has been detected at a threshold amount of the touch-sensitive display.

In some embodiments, the data representing the user input can include ambient light data representing an amount of light received by the ambient light sensor. In these examples, determining unit 1212 can determine whether the user input is the cover gesture over the touch-sensitive display by determining, based on the ambient light data, whether the amount of light received by the ambient light sensor is below a threshold light value.

In some embodiments, the data representing the user input can include motion data representing motion of the electronic device detected by a motion sensor. In these examples, determining unit 1212 can determine whether the user input is the cover gesture over the touch-sensitive display by determining, based on the motion data, whether the motion of the electronic device is above a threshold amount of motion and whether the motion occurred within a predetermined length of time after a notification event.

In some embodiments, the data representing the user input can include intensity data representing a characteristic intensity of a contact detected by the contact intensity sensor. In these examples, determining unit 1212 can determine whether the user input is the cover gesture over the touch-sensitive display by determining, based on the intensity data, whether the characteristic intensity of the contact detected by the contact intensity sensor is above a threshold intensity.

In some embodiments, processing unit 1208 can be configured to determine (e.g., using end time unit 1216) a termination time that the electronic device will exit the DND mode.

In some embodiments, processing unit 1208 can be configured to cause (e.g., exit unit 1218) the electronic device to exit the DND mode in response to a current time being the termination time. In some examples, the termination time is one hour after a time that it was determined that the user input is the cover gesture over the touch-sensitive display.

In some embodiments, the end time unit 1216 can be configured to determine the termination time based on contextual data. In some examples, the contextual data can include calendar data associated with the user, a list of tickets purchased by the user, a location of the user, an activity being performed by the user, a velocity of the user, or a connectivity state of the electronic device.

In some examples, the end time unit 1216 can be configured to determine the termination time by determining whether there is sufficient contextual data to generate a custom termination time; in response to determining that there is sufficient contextual data to generate the custom termination time: determining the custom termination time based on the contextual data; and setting the termination time to be equal to the custom termination time; and in response to determining that there is not sufficient contextual data to generate the custom termination time, setting the termination time to be equal to a default value. In some examples, the default value is one hour after a time that it was determined that the user input is the cover gesture over the touch-sensitive display.

In some embodiments, the end time unit 1216 can be configured to determine the custom termination time by determining an event based on the contextual data, the event having an end time of the event; and setting the custom termination time to be equal to the end time of the event.

In some embodiments, the processing unit 1208 can be configured to generate a notification (e.g., using notification unit 1220) a predetermined length of time prior to the termination time. In some examples, the notification can include an indication of a length of time until the termination time. In some examples, the notification can include a visual notification, an audio notification, or a haptic output notification.

In some embodiments, the processing unit 1208 can be configured to, while in the DND mode: receive (e.g., using receiving unit 1210) new data representing a new user input; determine (e.g., using determining unit 1212), based on the new data representing the new user input, whether the new user input is the cover gesture over the touch-sensitive display; and in accordance with a determination that the new user input is the cover gesture over the touch-sensitive display, determine (e.g., using DND end time unit 1216) a new termination time that the electronic device will exit the DND mode. In some examples, the new termination time is one hour after a time that it was determined that the new user input is the cover gesture over the touch-sensitive display.

In some embodiments, the processing unit 1208 can be configured to determine (e.g., using end time unit 1216) a length of time that the electronic device will be in the DND mode.

In some embodiments, the processing unit 1208 can be configured to cause (e.g., exit unit 1218) the electronic device to exit the DND mode in response to the expiration of the length of time. In some examples, the length of time is one hour.

In some embodiments, the end time unit 1216 can be configured to determine the length of time based on contextual data. In some examples, the contextual data can include calendar data associated with the user, a list of tickets purchased by the user, a location of the user, an activity being performed by the user, a velocity of the user, or a connectivity state of the electronic device.

In some embodiments, the end time unit 1216 can be configured to determine the length of time by determining whether there is sufficient contextual data to generate a custom length of time; in response to determining that there is sufficient contextual data to generate the custom length of time: determining the length of time based on the contextual data; and setting the length of time to be equal to the custom length of time; and in response to determining that there is not sufficient contextual data to generate the custom length of time, setting the length of time to be equal to a default value. In some examples, the default value is one hour.

In some embodiments, the end time unit 1216 can be configured to determine the custom length of time by determining an event based on the contextual data, determining a difference between a current time and the end time of the event, and setting the custom length of time to be equal to the difference between the current time and the end of time of the event.

In some embodiments, the processing unit 1208 can be configured to generate a notification (e.g., using notification unit 1220) a predetermined length of time prior to the expiration of the length of time. In some examples, the notification can include an indication of a length of time until the expiration of the length of time. In some examples, the notification can include a visual notification, an audio notification, or a haptic output notification.

In some embodiments, the processing unit 1208 can be configured to, while in the DND mode: receive (e.g., using receiving unit 1210) new data representing a new user input; determine (e.g., using determining unit 1212), based on the new data representing the new user input, whether the new user input is the cover gesture over the touch-sensitive display; and in accordance with a determination that the new user input is the cover gesture over the touch-sensitive display, determine (e.g., using DND end time unit 1216) a new length of time that the electronic device will be in the DND mode. In some examples, the new length of time is one hour.

In some embodiments, the processing unit 1208 can be configured to prevent all notifications from being presented while the electronic device is in the DND mode. In some examples, processing unit 1208 can be configured to prevent a subset of all notifications from being presented while the electronic device is in the DND mode. In some examples, processing unit 1208 can be configured to cease to display incoming electronic messages on the touch-sensitive display while the electronic device is in the DND mode. In some examples, processing unit 1208 can be configured to cease to produce haptic outputs in response to incoming electronic messages while the electronic device is in the DND mode. In some examples, processing unit 1208 can be configured to cease to produce audible outputs in response to incoming electronic messages while the electronic device is in the DND mode.

In some embodiments, the processing unit 1208 can be configured to display (e.g., using indicator unit 1222), on the touch-sensitive display, a DND indicator while the electronic device is in the DND mode.

Figure 13:
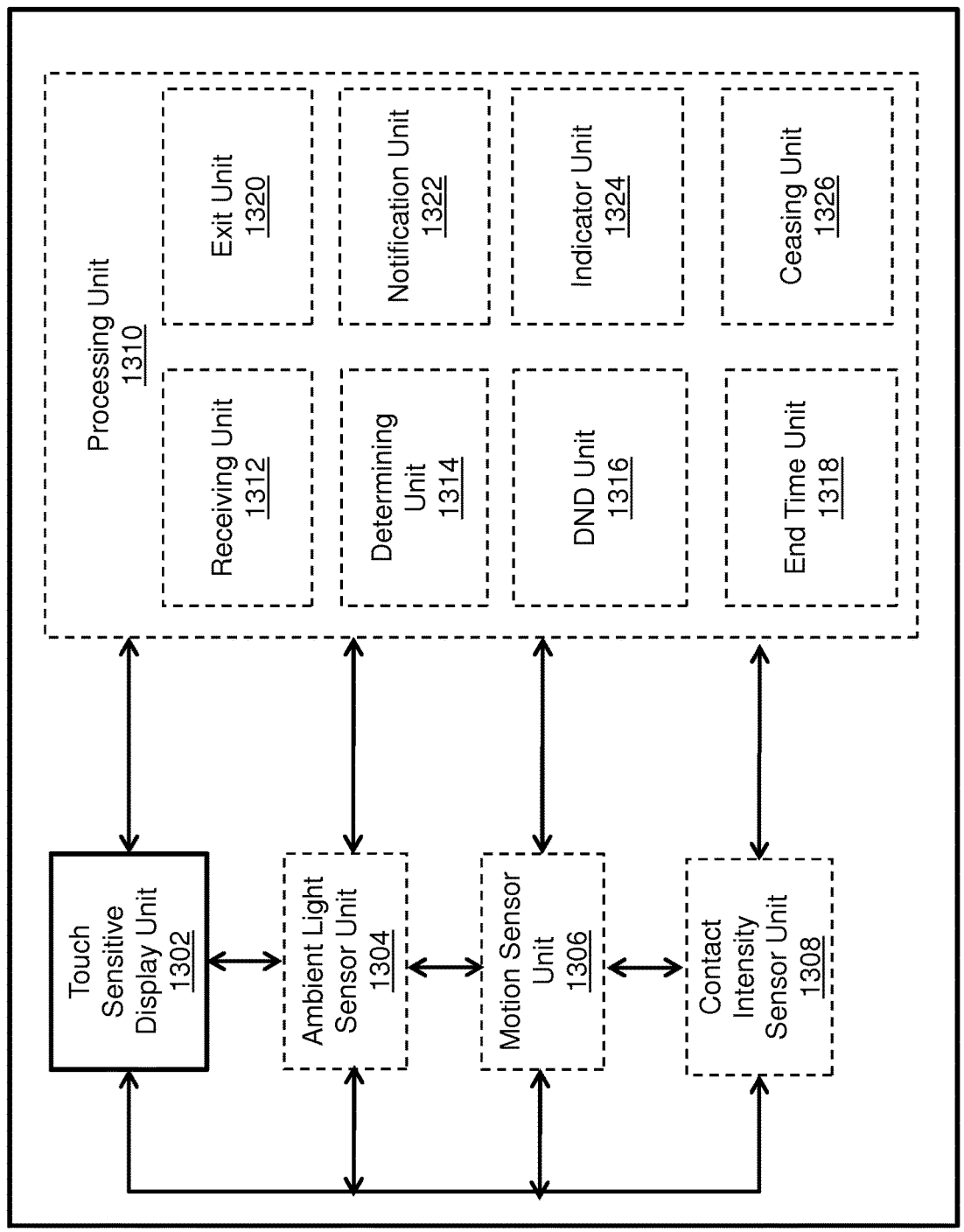
FIG. 13 is a functional block diagram of an electronic device in accordance with some embodiments.

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a touch sensitive display unit 1302 configured to display a graphic user interface and receive user gestures (e.g. combination of a touch-sensitive surface unit and display unit) and a processing unit 1310 coupled to the touch sensitive display unit 1302. In some embodiments, the electronic device includes, optionally, an ambient light sensor unit 1304, and the processing unit 1310 is coupled, optionally, to the ambient light sensor unit 1304. In some embodiments, the electronic device includes, optionally, a motion sensor unit 1306, and the processing unit 1310 is coupled, optionally, to the motion sensor unit 1306. In some embodiments, the electronic device includes, optionally, a contact intensity sensor unit 1308, and the processing unit 1310 is coupled, optionally, to the contact intensity sensor unit 1308. In some embodiments, processing unit 1310 can include a receiving unit 1312, a determining unit 1314, a DND unit 1316, an end time unit 1318, an exit unit 1320, a notification unit 1322, an indicator unit 1324, and a ceasing unit 1326.

The processing unit 1310 is configured to receive (e.g. using receiving unit 1312) data representing a user input. The processing unit 1310 is also configured to determine (e.g. using determining unit 1314), based on the data representing the user input, whether the user input is a cover gesture over the touch-sensitive display unit 1302 (e.g. touch-sensitive surface unit and display unit). The processing unit 1310 is further configured to, in accordance with a determination that the user input is the cover gesture over the touch-sensitive display unit 1302, cause (e.g. using the DND unit 1316) the device to enter a do not disturb (DND) mode.

In some embodiments, the data representing the user input can include touch data output by the touch-sensitive display unit 1302. In these embodiments, determining whether the user input is the cover gesture over the touch-sensitive display unit 1302 comprises determining, based on the touch data, whether a touch has been detected at a threshold amount of the touch-sensitive display unit 1302.

In some embodiments, the data representing the user input can include ambient light data representing an amount of light received by an ambient light sensor unit 1304. The ambient light sensor unit 1304 is coupled, optionally, to the processing unit 1310. In these embodiments, determining unit 1314 can determine whether the user input is the cover gesture over the touch-sensitive display unit 1302 by determining, based on the ambient light data, whether the amount of light received by the ambient light sensor unit 1304 is below a threshold light value.

In some embodiments, the data representing the user input can include motion data representing motion of the electronic device detected by a motion sensor unit 1306. The motion sensor unit 1306 is coupled, optionally, to the processing unit 1310. In these embodiments, determining whether the user input is the cover gesture over the touch-sensitive display unit 1302 comprises determining, based on the motion data, whether the motion of the electronic device is above a threshold amount of motion and whether the motion occurred within a predetermined length of time after a notification event.

In some embodiments, the data representing the user input can include intensity data representing a characteristic intensity of a contact detected by a contact intensity sensor unit 1308. The contact intensity sensor unit 1308 is coupled, optionally, to the processing unit 1310. In these embodiments, determining whether the user input is the cover gesture over the touch-sensitive display unit 1302 comprises determining, based on the intensity data, whether the characteristic intensity of the contact detected by the contact intensity sensor unit 1308 is above a threshold intensity.

In some embodiments, processing unit 1308 can be configured to, in response to determining that the user input is the cover gesture over the touch-sensitive display unit 1302, determine (e.g., using determining unit 1318) a termination time that the electronic device will exit the DND mode.

In some embodiments, processing unit 1308 can be configured to cause (e.g., using the exit unit 1320) the electronic device to exit the DND mode in response to a current time being the termination time.

In some embodiments, the termination time is one hour after a time that it was determined that the user input is the cover gesture over the touch-sensitive display unit 1302.

In some embodiments, the termination time is determined based on contextual data.

In some embodiments, the contextual data can include calendar data associated with the user.

In some embodiments, the contextual data can include a list of tickets purchased by the user.

In some embodiments, the contextual data can include a location of the user.

In some embodiments, the contextual data can include an activity being performed by the user.

In some embodiments, the contextual data can include a velocity of the user.

In some embodiments, the contextual data can include a connectivity state of the electronic device.

In some embodiments, determining the termination time that the electronic device will exit the DND mode comprises determining whether there is sufficient contextual data to generate a custom termination time; in response to determining that there is sufficient contextual data to generate the custom termination time, determining the custom termination time based on the contextual data; and setting the termination time to be equal to the custom termination time; and, in response to determining that there is not sufficient contextual data to generate the custom termination time, setting the termination time to be equal to a default value.

In some embodiments, determining the custom termination time based on the contextual data comprises: determining an event based on the contextual data, the event having an end time of the event and setting the custom termination time to be equal to the end time of the event.

In some embodiments, the default value is one hour after a time that it was determined that the user input is the cover gesture over the touch-sensitive display unit 1302.

In some embodiments, the processing unit 1310 can be configured to generate a notification (e.g., using the notification unit 1322) a predetermined length of time prior to the termination time.

In some embodiments, the notification can include an indication of a length of time until the termination time.

In some embodiments, the notification can include a visual notification, an audio notification, or a haptic output notification.

In some embodiments, the processing unit 1310 can be configured to, while in the DND mode: receive (e.g., using the receiving unit 1312) new data representing a new user input; determine (e.g., using the determining unit 1314), based on the new data representing the new user input, whether the new user input is the cover gesture over the touch-sensitive display unit 1302; and in accordance with a determination that the new user input is the cover gesture over the touch-sensitive display unit 1302, determine (e.g., using the determining unit 1314) a new termination time that the electronic device will exit the DND mode.

In some embodiments, the new termination time is one hour after a time that it was determined that the new user input is the cover gesture over the touch-sensitive display unit 1302.

In some embodiments, the processing unit 1310 can be configured to determine (e.g., using the end time unit 1318) a length of time that the electronic device will be in the DND mode.

In some embodiments, the processing unit 1310 can be configured to, in response to the expiration of the length of time, cause (e.g., using the exit unit 1320) the electronic device to exit the DND mode.

In some embodiments, the length of time is one hour.

In some embodiments, the length of time is determined based on contextual data.

In some embodiments, the contextual data can include calendar data associated with the user.

In some embodiments, the contextual data can include a list of tickets purchased by the user, In some embodiments, the contextual data can include a location of the user, an activity being performed by the user.

In some embodiments, the contextual data can include a velocity of the user.

In some embodiments, the contextual data can include a connectivity state of the electronic device.

In some embodiments, determining the length of time that the electronic device will be in the DND mode comprises determining whether there is sufficient contextual data to generate a custom length of time; in response to determining that there is sufficient contextual data to generate the custom length of time, determining the length of time based on the contextual data; and setting the length of time to be equal to the custom length of time; and in response to determining that there is not sufficient contextual data to generate the custom length of time, setting the length of time to be equal to a default value.

In some embodiments, determining the custom length of time based on the contextual data comprises determining an event based on the contextual data, the event having an end time of the event; determining a difference between a current time and the end time of the event, and setting the custom length of time to be equal to the difference between the current time and the end of time of the event.

In some embodiments, the default value is one hour.

In some embodiments, the processing unit 1310 can be configured to generate a notification (e.g., using the notification unit 1322) a predetermined length of time prior to the expiration of the length of time that the electronic device will be in the DND mode.

In some embodiments, the notification can include an indication of a length of time until the expiration of the length of time that the electronic device will be in the DND mode.

In some embodiments, the notification can include a visual notification, an audio notification, or a haptic output notification.

In some embodiments, the processing unit 1310 can be configured to, while in the DND mode: receive (e.g., using the receiving unit 1312) new data representing a new user input; determine (e.g., using the determining unit 1314), based on the new data representing the new user input, whether the new user input is the cover gesture over the touch-sensitive display unit 1302; and in accordance with a determination that the new user input is the cover gesture over the touch-sensitive display unit 1302, determine (e.g., using the determining unit 1314) a new length of time that the electronic device will be in the DND mode.

In some embodiments, the new length of time is one hour.

In some embodiments, the processing unit 1310 can be configured to prevent all notifications (e.g., using notification unit 1322) from being presented while the electronic device is in the DND mode.

In some embodiments, the processing unit 1310 can be configured to prevent a subset of all notifications (e.g., using the notification unit 1322) from being presented while the electronic device is in the DND mode.

In some embodiments, the processing unit 1310 can be configured to cease (e.g., using the ceasing unit 1326) to enable display of incoming electronic messages on the touch-sensitive display unit 1302 while the electronic device is in the DND mode.

In some embodiments, the processing unit 1310 can be configured to cease (e.g., using the ceasing unit 1326) to produce haptic outputs in response to incoming electronic messages while the electronic device is in the DND mode.

In some embodiments, the processing unit 1310 can be configured to cease (e.g., using the ceasing unit 1326) to produce audible outputs in response to incoming electronic messages while the electronic device is in the DND mode.

In some embodiments, the processing unit 1310 can be configured to enable display of (e.g., using the indicator unit 1324), on the touch-sensitive display unit 1302, a DND indicator while the electronic device is in the DND mode.

The operations described above with reference to FIGS. 6-7 are, optionally, implemented by components depicted in FIG. 1A-1B, 2, 3, 5A-B, or 13. For example, receiving operation 602 and determining operation 604 may be implemented by event sorter 170, event recognizer 180, and event handler 190. Event monitor 171 in event sorter 170 detects a contact on touch-sensitive display unit 113, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and embodiments as defined by the claims.

What is claimed is:

1. A non-transitory computer readable storage medium storing one or more programs, the one or more programs comprising instructions, which when executed by one or more processors of an electronic device comprising a touch-sensitive display that includes a touch-sensitive component and a display, cause the device to:

receive data representing a user input;

determine, based on the data representing the user input, whether the user input is a cover gesture over the touch-sensitive display, wherein determining whether the user input is a cover gesture includes determining, based on the data representing the user input, whether a touch has been detected at a threshold amount of the touch-sensitive display; and in response to receiving the data representing the user input:

in accordance with a determination that the user input is the cover gesture over the touch-sensitive display for greater than a threshold duration:

enter a do not disturb (DND) mode, wherein the electronic device forgoes providing at least one type of notification in response to receiving an incoming notification triggering event while in the DND mode, and wherein the electronic device remains in the DND mode, that was entered in response to detecting the cover gesture over the touch-sensitive display for greater than the threshold duration, until one or more conditions for exiting the DND mode are met; and perform a first predetermined action including displaying a first user interface; and in accordance with a determination that the user input is the cover gesture over the touch-sensitive display for not greater than the threshold duration, perform a second predetermined action including displaying a second user interface different from the first user interface.

2. The non-transitory computer readable storage medium of claim 1, wherein:

the electronic device further comprises an ambient light sensor;

the data representing the user input comprises ambient light data representing an amount of light received by the ambient light sensor; and determining whether the user input is the cover gesture over the touch-sensitive display comprises:

determining, based on the ambient light data, whether the amount of light received by the ambient light sensor is below a threshold light value.

3. The non-transitory computer readable storage medium of claim 1, wherein:

the electronic device further comprises a motion sensor;

the data representing the user input comprises motion data representing motion of the electronic device detected by the motion sensor; and determining whether the user input is the cover gesture over the touch-sensitive display comprises:

determining, based on the motion data, whether the motion of the electronic device is above a threshold amount of motion and whether the motion occurred within a predetermined length of time after a notification event.

4. The non-transitory computer readable storage medium of claim 1, wherein:
the electronic device further comprises a contact intensity sensor;
the data representing the user input comprises intensity data representing a characteristic intensity of a contact detected by the contact intensity sensor; and
determining whether the user input is the cover gesture over the touch-sensitive display comprises:
determining, based on the intensity data, whether the characteristic intensity of the contact detected by the contact intensity sensor is above a threshold intensity.

5. The non-transitory computer readable storage medium of claim 1, wherein the non-transitory computer readable storage medium further comprises instructions, which when executed by the one or more processors of the electronic device, cause the device to:
in response to determining that the user input is the cover gesture over the touch-sensitive display, determine a termination time that the electronic device will exit the DND mode.

6. The non-transitory computer readable storage medium of claim 5, wherein the non-transitory computer readable storage medium further comprises instructions, which when executed by the one or more processors of the electronic device, cause the device to:
in response to a current time being the termination time, exit the DND mode.

7. The non-transitory computer readable storage medium of claim 5, wherein the termination time is determined based on contextual data.

8. The non-transitory computer readable storage medium of claim 7, wherein determining the termination time that the electronic device will exit the DND mode comprises:
determining whether there is sufficient contextual data to generate a custom termination time;
in response to determining that there is sufficient contextual data to generate the custom termination time:
determining the custom termination time based on the contextual data; and
setting the termination time to be equal to the custom termination time; and
in response to determining that there is not sufficient contextual data to generate the custom termination time, setting the termination time to be equal to a default value.

9. The non-transitory computer readable storage medium of claim 8, wherein determining the custom termination time based on the contextual data comprises:
determining an event based on the contextual data, the event having an end time of the event; and
setting the customtermination time to be equal to the end time of the event.

10. The non-transitory computer readable storage medium of claim 5, wherein the non-transitory computer readable storage medium further comprises instructions, which when executed by the one or more processors of the electronic device; cause the device to:
generate a notification of a predetermined length of time prior to the termination time.

11. The non-transitory computer readable storage medium of claim 10, wherein the notification comprises an indication of a length of time until the termination time.

12. The non-transitory computer readable storage medium of claim 5, wherein the non-transitory computer readable storage medium further comprises instructions, which when executed by the one or more processors of the electronic device, cause the device to:
while in the DND mode:
receive new data representing a new user input;
determine, based on the new data representing the new user input, whether the new user input is a second cover gesture over the touch-sensitive display; and
in accordance with a determination that the new user input is the second cover gesture over the touch-sensitive display; determine a new termination time that the electronic device will exit the DND mode.

13. The non-transitory computer readable storage medium of claim 12, wherein the new termination time is one hour after a time that it was determined that the new user input is the second cover gesture over the touch-sensitive display.

14. The non-transitory computer readable storage medium of claim 1, wherein the non-transitory computer readable storage medium further comprises instructions, which when executed by the one or more processors of the electronic device; cause the device to:
in response to determining that the user input is the cover gesture over the touch-sensitive display, determine a length of time that the electronic device will be in the DND mode.

15. The non-transitory computer readable storage medium of claim 14, wherein the non-transitory computer readable storage medium further comprises instructions, which when executed by the one or more processors of the electronic device, cause the device to:
in response to the length of time expiring, exit the DND mode.

16. The non-transitory computer readable storage medium of claim 14, wherein the length of time is determined based on contextual data.

17. The non-transitory computer readable storage medium of claim 16, wherein determining the length of time that the electronic device will be in the DND mode comprises:
determining whether there is sufficient contextual data to generate a custom length of time;
in response to determining that there is sufficient contextual data to generate the custom length of time:
determining the custom length of time based on the contextual data; and
setting the length of time to be equal to the custom length of time; and
in response to determining that there is not sufficient contextual data to generate the custom length of time, setting the length of time to be equal to a default value.

18. The non-transitory computer readable storage medium of claim 17, wherein determining the custom length of time based on the contextual data comprises:
determining an event based on the contextual data, the event having an end time of the event;
determining a difference between a current time and the end time of the event; and
setting the custom length of time to be equal to the difference between the current time and the end of time of the event.

19. The non-transitory computer readable storage medium of claim 14, wherein the non-transitory computer readable storage medium further comprises instructions, which when executed by the one or more processors of the electronic device, cause the device to:

generate a notification of a predetermined length of time prior to expiration of the length of time that the electronic device will be in the DND mode.

20. The non-transitory computer readable storage medium of claim 19, wherein the notification comprises an indication of a length of time until the expiration of the length of time that the electronic device will be in the DND mode.

21. The non-transitory computer readable storage medium of claim 14, wherein the non-transitory computer readable storage medium further comprises instructions, which when executed by the one or more processors of the electronic device, cause the device to:
while in the DND mode:
receive new data representing a new user input;
determine, based on the new data representing the new user input, whether the new user input is a second cover gesture over the touch-sensitive display; and
in accordance with a determination that the new user input is the second cover gesture over the touch-sensitive display, determine a new length of time that the electronic device will be in the DND mode.

22. The non-transitory computer readable storage medium of claim 1, wherein the non-transitory computer readable storage medium further comprises instructions, which when executed by the one or more processors of the electronic device, cause the device to:
prevent all notifications from being presented while the electronic device is in the DND mode.

23. The non-transitory computer readable storage medium of claim 1, wherein the non-transitory computer readable storage medium further comprises instructions, which when executed by the one or more processors of the electronic device, cause the device to:
prevent a subset of all notifications from being presented while the electronic device is in the DND mode.

24. The non-transitory computer readable storage medium of claim 1, wherein the non-transitory computer readable storage medium further comprises instructions, which when executed by the one or more processors of the electronic device, cause the device to:
cease to produce haptic outputs in response to incoming electronic messages while the electronic device is in the DND mode.

25. The non-transitory computer readable storage medium of claim 1, wherein the non-transitory computer readable storage medium further comprises instructions, which when executed by the one or more processors of the electronic device, cause the device to:
cease to produce audible outputs in response to incoming electronic messages while the electronic device is in the DND mode.

26. The non-transitory computer readable storage medium of claim 1, wherein the non-transitory computer readable storage medium further comprises instructions, which when executed by the one or more processors of the electronic device, cause the device to:
after entering the DND mode:
detect an incoming notification triggering event while in the DND mode; and
in response to detecting the incoming notification triggering event while in the DND mode:
provide a notification of a first type corresponding to the incoming notification triggering event; and
forgo providing a notification of a second type corresponding to the incoming notification triggering event.

27. A computer-implemented method comprising:
at an electronic device comprising a touch-sensitive display that includes a touch-sensitive component and a display:
receiving data representing a user input;
determining, based on the data representing the user input, whether the user input is a cover gesture over the touch-sensitive display, wherein determining whether the user input is a cover gesture includes determining, based on the data representing the user input, whether a touch has been detected at a threshold amount of the touch-sensitive display; and
in response to receiving the data representing the user input:
in accordance with a determination that the user input is the cover gesture over the touch-sensitive display for greater than a threshold duration:
entering a do not disturb (DND) mode, wherein the electronic device forgoes providing at least one type of notification in response to receiving an incoming notification triggerin event while in the DND mode, and wherein the electronic device remains in the DND mode, that was entered in response to detecting the cover gesture over the touch-sensitive display for greater than the threshold duration, until one or more conditions for exiting the DND mode are met; and
performing a first predetermined action including displaying a first user interface:
in accordance with a determination that the user input is the cover gesture over the touch-sensitive display for not greater than the threshold duration, performing a second predetermined action including displaying a second user interface different from the first user interface.

28. The computer-implemented method of claim 27, wherein:
the electronic device further comprises an ambient light sensor;
the data representing the user input comprises ambient light data representing an amount of light received by the ambient light sensor; and
determining whether the user input is the cover gesture over the touch-sensitive display comprises:
determining, based on the ambient light data, whether the amount of light received by the ambient light sensor is below a threshold light value.

29. The computer-implemented method of claim 27, wherein:
the electronic device further comprises a motion sensor;
the data representing the user input comprises motion data representing motion of the electronic device detected by the motion sensor; and
determining whether the user input is the cover gesture over the touch-sensitive display comprises:
determining, based on the motion data, whether the motion of the electronic device is above a threshold amount of motion and whether the motion occurred within a predetermined length of time after a notification event.

30. The computer-implemented method of claim 27, wherein:
the electronic device further comprises a contact intensity sensor;
the data representing the user input comprises intensity data representing a characteristic intensity of a contact detected by the contact intensity sensor; and determining whether the user input is the cover gesture over the touch-sensitive display comprises:
  determining, based on the intensity data, whether the characteristic intensity of the contact detected by the contact intensity sensor is above a threshold intensity.

31. The computer-implemented method of claim 27, further comprising:
  in response to determining that the user input is the cover gesture over the touch-sensitive display, determining a termination time that the electronic device will exit the DND mode.

32. The computer-implemented method of claim 31, further comprising:
  in response to a current time being the termination time, exiting the DND mode.

33. The computer-implemented method of claim 27, further comprising:
  in response to determining that the user input is the cover gesture over the touch-sensitive display, determining a length of time that the electronic device will be in the DND mode.

34. The computer-implemented method of claim 33, further comprising:
  in response to the length of time expiring, exiting the DND mode.

35. The computer-implemented method of claim 27, further comprising:
  preventing, all notifications from being presented while the electronic device is in the DND mode.

36. The computer-implemented method of claim 27, further comprising:
  preventing a subset of all notifications from being presented while the electronic device is in the DND mode.

37. The computer-implemented method of claim 27, further comprising:
  ceasing to produce haptic outputs in response to incoming electronic messages while the electronic device is in the DND mode.

38. The computer-implemented method of claim 27, further comprising:
  ceasing to produce audible outputs in response to incoming electronic messages while the electronic device is in the DND mode.

39. The computer-implemented method of claim 27, further comprising:
  after entering the DND mode:
    detecting an incoming notification triggering event while in the DND mode; and
    in response to detecting the incoming notification triggering event while in the DND mode:
      providing a notification of a first type corresponding to the incoming notification triggering event; and
      forgoing providing a notification of a second type corresponding to the incoming notification triggering event.

40. An electronic device, comprising:
  a touch-sensitive display that includes a touch-sensitive component and a display;
  one or more processors;
  a memory; and
  one or more programs, wherein the one or more programs are stored in the memory and configured to be executed by the one or more processors, the one or more programs including instructions for:
    receiving data representing a user input;
    determining, based on the data representing the user input, whether the user input is a cover gesture over the touch-sensitive display, wherein determining whether the user input is a cover gesture includes determining, based on the data representing the user input, whether a touch has been detected at a threshold amount of the touch-sensitive display; and
    in response to receiving the data representing the user input:
      in accordance with a determination that the user input is the cover gesture over the touch-sensitive display for greater than a threshold duration:
        entering a do not disturb (DND) mode, wherein the electronic device forgoes providing at least one type of notification in response to receiving an incoming notification triggering event while in the DND mode, and wherein the electronic device remains in the DND mode, that was entered in response to detecting the cover gesture over the touch-sensitive display for greater than the threshold duration, until one or more conditions for exiting the DND mode are met; and
        performing a first predetermined action including displaying a first user interface;
      in accordance with a determination that the user input is the cover gesture over the touch-sensitive display for not greater than the threshold duration, performing a second predetermined action including displaying a second user interface different from the first user interface.

41. The electronic device of claim 40, wherein:
the electronic device further comprises an ambient light sensor;
the data representing the user input comprises ambient light data representing an amount of light received by the ambient light sensor; and
determining whether the user input is the cover gesture over the touch-sensitive display comprises:
  determining, based on the ambient light data, whether the amount of light received by the ambient light sensor is below a threshold light value.

42. The electronic device of claim 40, wherein:
the electronic device further comprises a motion sensor;
the data representing the user input comprises motion data representing motion of the electronic device detected by the motion sensor; and
determining whether the user input is the cover gesture over the touch-sensitive display comprises:
  determining, based on the motion data, whether the motion of the electronic device is above a threshold amount of motion and whether the motion occurred within a predetermined length of time after a notification event.

43. The electronic device of claim 40, wherein:
the electronic device further comprises a contact intensity sensor;
the data representing the user input comprises intensity data representing a characteristic intensity of a contact detected by the contact intensity sensor; and
determining whether the user input is the cover gesture over the touch-sensitive display comprises:
  determining, based on the intensity data, whether the characteristic intensity of the contact detected by the contact intensity sensor is above a threshold intensity.

44. The electronic device of claim 40, wherein the one or more programs further include instructions for:
  in response to determining that the user input is the cover gesture over the touch-sensitive display, determining a termination time that the electronic device will exit the DND mode.

45. The electronic device of claim 44, wherein the one or more programs further include instructions for:
  in response to a current time being the termination time, exiting the DND mode.

46. The electronic device of claim 40, wherein the one or more programs further include instructions for:
  in response to determining that the user input is the cover gesture over the touch-sensitive display, determining a length of time that the electronic device will be in the DMD mode.

47. The electronic device of claim 46, wherein the one or more programs further include instructions for:
  in response to the length of time expiring, exiting the DND mode.

48. The electronic device of claim 40, wherein the one or more programs further include instructions for:
  preventing all notifications from being presented while the electronic device is in the DND mode.

49. The electronic device of claim 40, wherein the one or more programs further include instructions for:
  preventing a subset of all notifications from being presented while the electronic device is in the DND mode.

50. The electronic device of claim 40, wherein the one or more programs further include instructions for:
  ceasing to produce haptic outputs in response to incoming electronic messages while the electronic device is in the DND mode.

51. The electronic device of claim 40, wherein the one or more programs further include instructions for:
  ceasing to produce audible outputs in response to incoming electronic messages while the electronic device is in the DND mode.

52. The electronic device of claim 40, wherein the one or more programs further include instructions for:
  after entering the DND mode:
    detecting an incoming notification triggering event while in the DND mode; and
    in response to detecting the incoming notification triggering event while in the DND mode:
      providing a notification of a first type corresponding to the incoming notification triggering event; and
      forgoing providing a notification of a second type corresponding to the incoming notification triggering event.

* * * * *

UNITED STATES PATENT AND TRADEMARK OFFICE
CERTIFICATE OF CORRECTION

PATENT NO. : 11,526,270 B2
APPLICATION NO. : 14/830693
DATED : December 13, 2022
INVENTOR(S) : Chanaka G. Karunamuni et al.

Page 1 of 1

It is certified that error appears in the above-identified patent and that said Letters Patent is hereby corrected as shown below:

In the Claims

In Column 47, Line 56, Claim 9, delete "customertermination" and insert -- customer termination --.

In Column 47, Line 62, Claim 10, delete "device;" and insert -- device, --.

In Column 48, Line 13, Claim 12, delete "display;" and insert -- display, --.

In Column 48, Line 24, Claim 14, delete "device;" and insert -- device, --.

In Column 50, Line 20, Claim 27, delete "triggerin" and insert -- triggering --.

In Column 50, Line 29, Claim 27, delete "interface:" and insert -- interface; --.

In Column 51, Line 30, Claim 35, delete "preventing," and insert -- preventing --.

In Column 53, Line 16, Claim 46, delete "DMD" and insert -- DND --.

Signed and Sealed this
Eighteenth Day of April, 2023

Katherine Kelly Vidal
*Director of the United States Patent and Trademark Office*